(12) United States Patent
Drymalski

(10) Patent No.: US 7,195,264 B2
(45) Date of Patent: Mar. 27, 2007

(54) MANUALLY POWERED VEHICLE HAVING IMPROVED STEERING

(75) Inventor: Robert Drymalski, 613 Hinman Ave. Apt. 1F, Evanston, IL (US) 60202

(73) Assignee: Robert Drymalski, Chicago, IL (US)

( * ) Notice: Subject to any disclaimer, the term of this patent is extended or adjusted under 35 U.S.C. 154(b) by 0 days.

(21) Appl. No.: 10/884,499

(22) Filed: Jul. 2, 2004

(65) Prior Publication Data

US 2005/0087952 A1  Apr. 28, 2005

Related U.S. Application Data

(63) Continuation-in-part of application No. 10/103,366, filed on Mar. 20, 2002, now Pat. No. 6,764,089.

(51) Int. Cl.
*B62M 1/04* (2006.01)
*B62M 1/14* (2006.01)

(52) U.S. Cl. ............... 280/246; 280/255; 280/282

(58) Field of Classification Search ............... 280/236, 280/242.1, 243, 244, 246, 247, 248, 251, 280/252, 255, 263, 270
See application file for complete search history.

(56) References Cited

U.S. PATENT DOCUMENTS

| 296,396 | A | 4/1884 | Davies |
|---|---|---|---|
| 369,860 | A | 9/1887 | Kempster |
| 439,382 | A | 10/1890 | Bryden |
| 631,531 | A | 8/1899 | Sargent |
| 970,109 | A | 9/1910 | Plummer |
| 1,418,266 | A | 5/1922 | Thorpe et al. |
| 4,358,126 | A | 11/1982 | Mitchell et al. |
| 4,524,987 | A | 6/1985 | Kim |

(Continued)

FOREIGN PATENT DOCUMENTS

EP  0 318 677  10/1988

(Continued)

OTHER PUBLICATIONS

Rowbike, Scott Olson, http://www.rowbike.com/models.html, Dec. 27, 2001.

(Continued)

*Primary Examiner*—Anne Marie Boehler
(74) *Attorney, Agent, or Firm*—Bell, Boyd & Lloyd LLP

(57) ABSTRACT

A manually powered rowing vehicle is provided. A chain is wrapped around a portion of first and second free-wheel wheel sprockets, which can spin freely in one direction but not the other. The first free-wheel drive sprocket drives a rear wheel. The second free-wheel drive sprocket connects to one end of a lever arm, which pivotally connects to a frame. When the rider pulls the other end of the lever arm towards their body, the first free-wheel drive sprocket grabs the chain and pulls the chain forward. The chain in turn pulls the second free-wheel drive sprocket, which rotates the rear wheel forward. When the rider pushes the lever arm away from their body, the first free-wheel drive sprocket spins freely to allow the lever arm to return to the pull position without moving the linked chain or the vehicle. Various embodiments for steering the vehicle are also described.

23 Claims, 23 Drawing Sheets

U.S. PATENT DOCUMENTS

| | | |
|---|---|---|
| 4,549,874 A | 10/1985 | Wen |
| 4,601,482 A | 7/1986 | Ferez |
| 4,632,414 A | 12/1986 | Ellefson |
| 4,700,962 A | 10/1987 | Salmon |
| 4,705,284 A | 11/1987 | Stout |
| 4,796,907 A | 1/1989 | Geller |
| 4,811,964 A | 3/1989 | Horn |
| 4,865,344 A | 9/1989 | Romero, Sr. et al. |
| 4,886,287 A | 12/1989 | Krause, II et al. |
| 4,925,200 A | 5/1990 | Jones |
| 4,941,673 A | 7/1990 | Bennett |
| 4,976,451 A | 12/1990 | Kamenov |
| 5,135,458 A | 8/1992 | Huang |
| 5,209,506 A | 5/1993 | Klopfenstein |
| 5,280,936 A | 1/1994 | Schmidlin |
| 5,284,355 A | 2/1994 | Ishii |
| 5,330,218 A | 7/1994 | Escudero |
| 5,492,349 A | 2/1996 | Ferez |
| 5,536,029 A | 7/1996 | Gramckow |
| 5,690,346 A | 11/1997 | Keskitalo |
| 5,826,897 A | 10/1998 | Beard |
| 5,865,455 A | 2/1999 | Taylor |
| 5,876,052 A | 3/1999 | Olson et al. |
| 5,901,973 A | 5/1999 | Warren |
| 6,155,584 A | 12/2000 | Dallet |
| 6,206,394 B1 | 3/2001 | Olson et al. |
| 6,224,078 B1 | 5/2001 | Tidcomb |
| 6,234,504 B1 | 5/2001 | Taylor |
| 6,325,398 B1 | 12/2001 | Banzi |
| 6,764,089 B2 * | 7/2004 | Drymalski .................. 280/246 |

FOREIGN PATENT DOCUMENTS

| | | |
|---|---|---|
| GB | 13330 | 6/1896 |
| JP | 6-154269 | 6/1994 |
| WO | WO 94/18059 | 8/1994 |

OTHER PUBLICATIONS

Aviroute—Rowing Machine—Rowing Bike, http://www.aviroute.com/rowbike/rowing-motion/, Dec. 27, 2001.

Fetish, Wired, Jan. 2001.

*Patents*, Sabra Chartrand, The New York Times, Nov. 17, 2003.

* cited by examiner

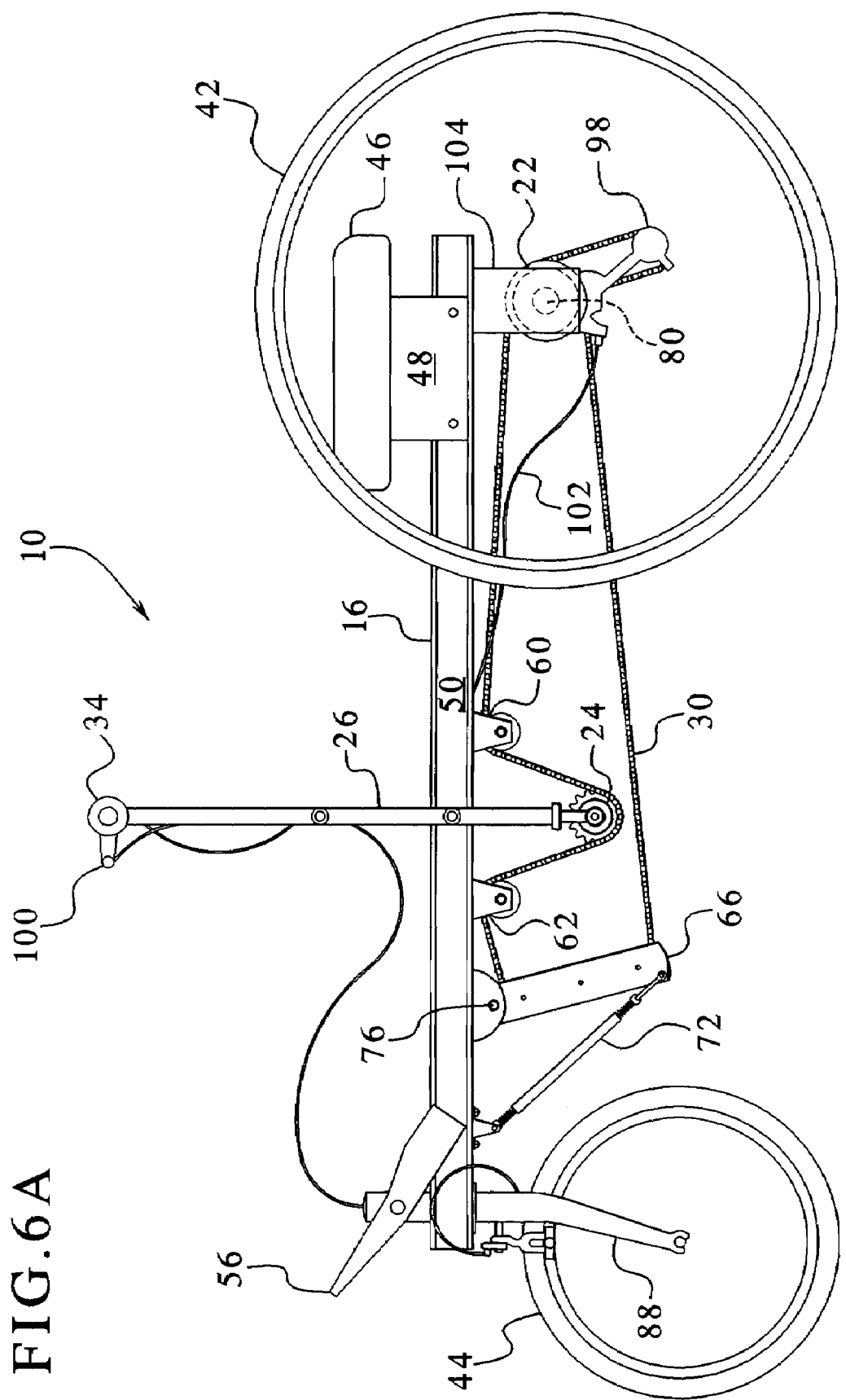

MANUALLY POWERED VEHICLE HAVING IMPROVED STEERING

PRIORITY CLAIM

This application claims the benefit as a continuation-in-part of U.S. patent application Ser. No. 10/103,366, filed Mar. 20, 2002 now U.S. Pat. No. 6,764,089, entitled "Manually Powered Drive Mechanism And Vehicle Employing Same," the entire contents of which are hereby incorporated by reference and relied upon.

BACKGROUND OF THE INVENTION

The present invention relates to manually powered vehicles. More particularly, the present invention relates to a manually powered drive mechanism and a vehicle and method of operating a vehicle employing same.

Unicycles, bicycles and tricycles have been used for years to provide an economic mode of transportation, for fun and entertainment, etc. Bicycles are by far the most common of these devices and generally employ power from a person's lower body, wherein foot pedals typically connect to crank shafts, which in turn rotate a sprocket that drives a chain linking a rear wheel. The drive mechanism of a standard bicycle is relatively simple, which has no doubt helped the bicycle to achieve such enormous popularity.

One primary use of the bicycle is to provide exercise. Bicycles provide an excellent workout for the lower body. Bicycles, however, do not equally use a person's upper body muscles. On a bicycle, the rider typically uses the rider's upper body to steer and to prop-up or support their upper body. Consequently, bicycles do not provide a good total body workout.

One type of machine that does provide a total body workout is a rowing machine. Rowing machines simulate the motion one uses to row a boat. Rowing machines typically consist of a frame that is supported on the floor. Rowing machines provide a seat that rides on a rail between a forward position and a rear position. Rowing machines typically provide handles that easily push forward but provide a resistance to being pulled back. Although rowing machines provide excellent exercise for many muscles including legs, arms, back, shoulders and stomach, they are purely for the benefit of exercise and do not have the ability to move people.

Manually powered vehicles have been developed that combine arm and leg power. These machines attempt to harness the overall total body benefits of a rowing type exercise with a device that can move people. While these machines exist, they have to date not gained widespread commercial popularity. There appear to be a number of reasons to account for the fact that "rowbikes" and the like have not become popular. First, many of the existing rowbikes appear to be awkward and fragile. Second, the mechanisms that drive the rowbikes appear to be complicated. That is, when compared to a bicycle, the rowbike designs contain many more parts, which are awkwardly configured. The numerous and intricately juxtaposed parts create cost and add to the potential for mechanical failure.

Accordingly, there exists a need for a simple, inexpensive, total body workout device that is also capable of transporting a rider.

SUMMARY OF THE INVENTION

The present invention provides a driving mechanism for a manually powered vehicle. More particularly, the present invention provides a manually powered driving mechanism that is suitable for driving vehicles having two, three or four wheels. The driving mechanism includes a frame. At least one rear wheel rotatably connects to the frame via a drive shaft.

A first free-wheel driver, for example, a free-wheel drive sprocket connects to the drive shaft, which holds the rear wheel. A lever arm pivotally attaches to the middle portion of the frame. One end of the lever arm includes a handle that can be grasped and pulled by a rider. The other end of the lever arm rotatably connects to a second free-wheel driver or drive sprocket. The first and second free-wheel drive sprockets spin freely in one direction but not the other.

A linkage or linked chain wraps around a portion of the second free-wheel wheel sprocket and extends towards the rear wheel and wraps around a portion of the first free-wheel drive sprocket. The first free-wheel drive sprocket drives the rear wheel. The chain runs from the first free-wheel drive sprocket, over a roller that pivotally attaches to the frame and back to the second free-wheel drive sprocket, which connects to the end of the lever arm.

When the rider pulls the lever arm towards the rider's body, the second free-wheel drive sprocket grabs the chain and pulls the chain forward over the roller. The chain in turn pulls the first free-wheel drive sprocket, which rotates the rear wheel forward. When the rider pushes the lever arm away from the rider's body, the second free-wheel drive sprocket spins freely to allow the lever arm to return to the pull position without moving the linked chain or the vehicle.

In one embodiment, the roller is positioned on the frame between the first and second free-wheel sprockets. A second roller mounts to the frame closer to the front of the vehicle than the first roller. The linkage or chain extends over the first roller, then downwardly away from the frame and around the bottom of the second free-wheel sprocket (connected to the lever arm), and then back up towards the frame and around the second roller.

From the second roller, the chain extends towards the front of the vehicle and then downwardly from the frame around a tensioner, which is pivotally attached to the frame. A spring or other type of biasing mechanism, such as a piston/cylinder, is biased to rotate the tensioner towards the frame in one rotational direction, while the chain, when pulled by the lever arm and second free-wheel driver, tends to pull the tensioner towards the frame in the opposite rotational direction. The net result is that the tensioner remains extended generally perpendicularly downwardly from the frame and operates to hold the linkage or chain away from the lever arm and the second free-wheel sprocket, to allow same to move back and forth and drive the vehicle without being obstructed by the chain, which runs towards the back of the vehicle to the rear wheel.

The vehicle includes a seat that slidingly engages the frame. The seat slides backward and forward, respectively, as the person or rider pulls the lever arm back towards the rider's body and pushes the lever arm forward towards the front of the vehicle. The lever arm includes a brake lever for manually operating a cable driven brake. The brake includes a brake pad attached adjacent to one of the wheels. In an embodiment, the brake pad frictionally engages a front, steerable wheel.

In one embodiment, at least one front, steerable wheel rotatably attaches to the frame. A steering column extends from the front, steerable wheel, through the frame, and connects to a steering bar that has foot pads attached on each end. Each foot pad holds one of the rider's feet, so that the rider steers the vehicle with the rider's legs. The rider extends his or her right leg to turn the steering bar counter-clockwise from the rider's viewpoint to turn the vehicle to the left. The rider extends his or her left leg to turn the steering bar clockwise from the rider's viewpoint to turn the vehicle to the right.

The driving mechanism in one embodiment includes a multitude of different gears. The first or rear free-wheel driver includes a number of different gear settings, for example, a number of different free-wheel sprockets of different size. A standard gear shift rear derailer mounts at the rear of the vehicle and moves the linked chain from one gear to another when the rider engages and moves a gear shift lever and a link between the gear shift lever and the derailer.

The driving mechanism in one preferred embodiment drives one rear wheel. For proper steering of the vehicle it is preferred that the driving mechanism not drive two rear wheels. In any case, the driving mechanism of the present invention is easily adapted to power two, three or four-wheeled vehicles. The four-wheeled embodiment may also be configured as a wheelchair. The driving mechanism does not change, rather, the wheels mount differently and the steering and braking mechanisms are modified.

The present invention also includes multiple embodiments for a rider to steer the vehicle using the rider's hands instead of the rider's feet. In one embodiment, the lever arm that drives the vehicle is attached via a cabling system to the steering column of the front wheel. The rider rotates a steering portion of the lever arm vertically or substantially vertically, similar to the motion of an automobile steering wheel, to turn the row vehicle left or right. In other embodiments, a flexible but torque-applying member that enables the steering portion to be rotated horizontally or substantially horizontally with respect to the lever arm, which is more customary for bicycles and the like. The motion of the lever arm pivoting back and forth to drive the vehicle creates the need for the flexible member, which bends back and forth as the pivoting lever arm is moved. The flexible member also transfers torque from the twisting of the steering portion to a mechanism that couples to and turns the wheel.

In one embodiment, the bendable mechanism includes a bendable or flexible drive shaft, which includes wound metal or mesh that can flex back and forth in a bending moment direction as well as transfer torque in a twisting direction to a member or rod that extends along the frame, from near the pivot point of the lever arm to the front wheel. The member is connected to the steering column and moves to turn the column.

In another embodiment, a universal gear joint is used instead of the flexible cable. In yet a further alternative, a universal joint or a doubling-acting universal joint is employed. In one preferred embodiment, a double acting universal gear joint is used, which is telescopically constructed so that the U-joints can translate with respect to each other.

Accordingly, it is an advantage of the present invention to provide a total body workout driving mechanism and a moveable vehicle embodying same.

It is another advantage of the present invention to provide a rowing vehicle having a simplistic driving mechanism.

It is a further advantage of the present invention to provide a rowing vehicle having a cost effective driving mechanism.

It is still another advantage of the present invention to provide a driving mechanism for a two-wheeled rowing vehicle.

It is still a further advantage of the present invention to provide a driving mechanism for a three-wheeled rowing vehicle.

It is yet another advantage of the present invention to provide a driving mechanism for a four-wheeled rowing vehicle.

Moreover, it is an advantage of the present invention to provide multiple different mechanisms and methods for steering the rowing vehicle.

Additional features and advantages of the present invention are described in, and will be apparent from, the following Detailed Description of the Invention and the figures.

BRIEF DESCRIPTION OF THE FIGURES

FIG. 6A is an elevation view of the three-wheeled vehicle that illustrates one embodiment for the gear shift mechanism of the present invention.

DETAILED DESCRIPTION OF THE INVENTION

Figure 1:
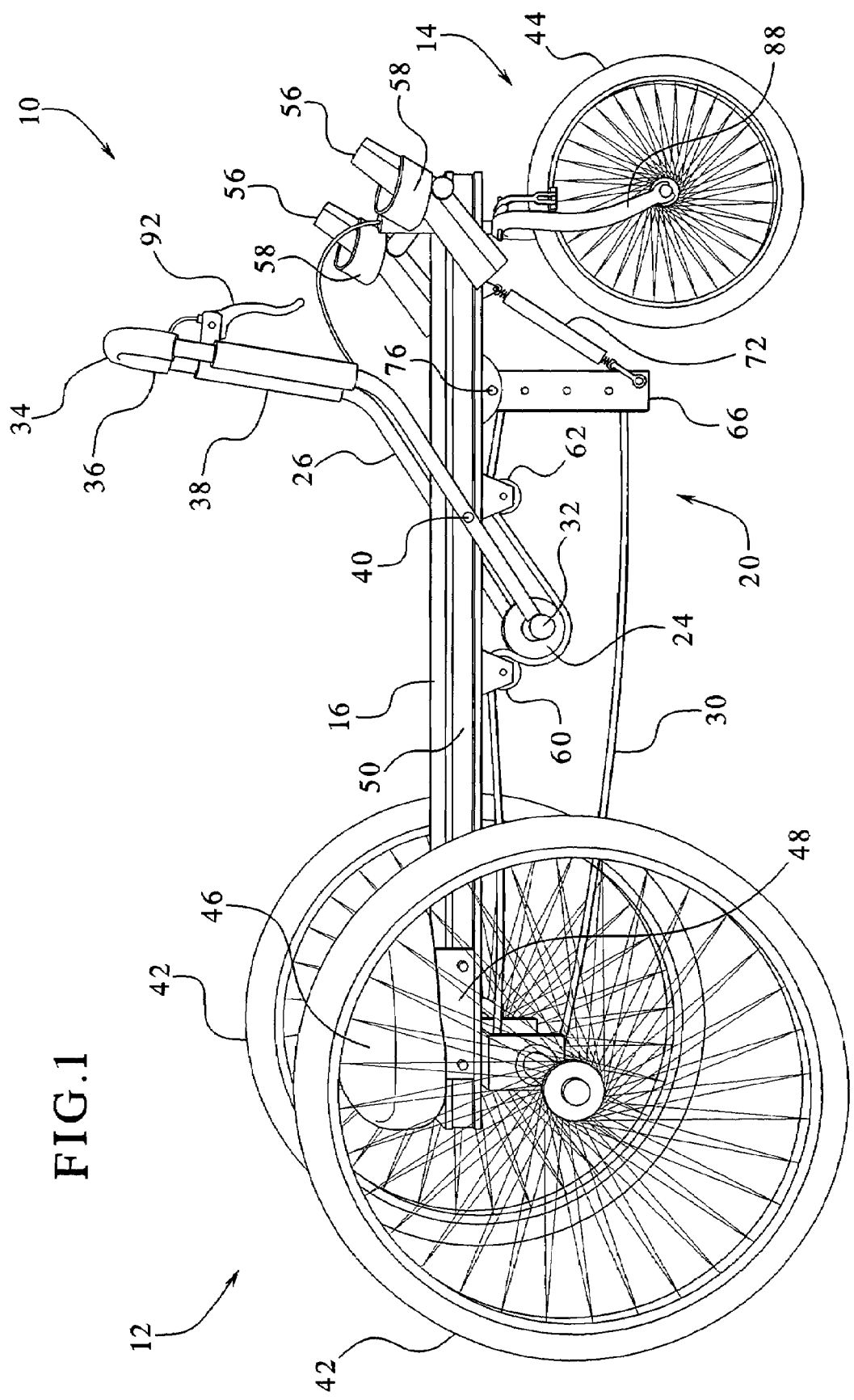
FIG. 1 is a perspective view of a three-wheeled embodiment of the vehicle and drive mechanism of the present invention, wherein the lever arm is substantially in a full forward position, that is, in a position to be pulled backward to thrust the vehicle forward.

Referring now to the drawings and in particular to FIG. 1, one embodiment of a row vehicle 10 is illustrated. The row vehicle 10 includes a rear end 12 and a front end 14. A frame 16 is provided. While frame 16 is illustrated herein a simple channel or bar, the frame 16 alternatively has supports or struts commonly provided on bicycles, or other desired structural members, etc. The frame 16 includes flanges and/or channels in order to provide additional strength and also to provide areas on which to mount various items. The frame 16 includes various types of coatings which protect the material of the frame 16 and also provide aesthetic value. For example, if the frame 16 is aluminum, it can be anodized or painted. If steel, frame 16 can be primed and/or beadblasted and painted or otherwise treated, such as with a plating technique. While a metal or metal alloy frame is preferred, it is also possible that frame 16 is made of plastic, wood, or other suitable material or any combination of the above listed materials.

The row vehicle 10 includes a drive mechanism 20, which attaches or is supported in various places by the frame 16. The drive mechanism includes a first free-wheel driver 22 which is hidden from view in FIG. 1, but which may be readily viewed in FIG. 4. The drive mechanism 20 also includes a second free-wheel driver 24, which is illustrated in FIG. 1 as connecting to one end of a lever arm 26.

The first and second free-wheel drivers in one embodiment include free-wheel drive sprockets. The free-wheel drivers or drive sprockets are known in the art and spin freely in one direction about a shaft, such as the drive shaft 28 illustrated in FIG. 4. The free-wheel driver or drive sprockets, however, do not spin in the other direction. One example of a suitable free-wheel driver or free-wheel drive sprocket for the drive mechanism 20 of the present invention is provided by Worksman Trading Corp., Ozone Park, N.Y., Item #4129, 22 teeth freewheel sprocket.

While the first and second free-wheel drivers in one embodiment are drive sprockets, the free-wheel drivers 22 and 24 may have configurations other than a sprocket configuration, as long as the mechanism has the ability to latch into or otherwise mechanically engage a linkage 30. The linkage 30 in an embodiment is a standard link chain. The drive sprockets 22 and 24 engage the linked chain 30 in the same manner as is well known with the standard bicycle. In another embodiment, the drive sprockets are pulleys, and the linkage 30 is a tensioned plastic or rubber belt. In either case, the first and second drivers 22, 24 in one preferred embodiment are rotatable and disk shaped. For purposes of illustration, the remainder of this specification will refer to the free-wheel drivers 22 and 24 as free-wheel drive sprockets and the linkage 30 as a chain 30. However, it should be appreciated that the present invention is expressly not limited to these embodiments.

The lever arm 26 of the drive mechanism 20 rotatably connects at one end to the second free-wheel drive sprocket 24. The free-wheel drive sprocket 24 rotates freely in one direction about a pivot 32 at the end of the lever arm 26. The free-wheel drive sprocket 24 does not, however, rotate in both directions about the pivot 32 of the level arm 26. The other end of the lever arm 26 includes a handle 34. The lever arm 26 in one embodiment is made of a strong metal such as steel, stainless steel or aluminum. The handle 34 in one embodiment includes a material that is comfortable for a rider to grasp, such as plastic, rubber or foam rubber. As illustrated, the handle 34 includes an upper grasping portion 36 and a lower grasping portion 38 which enable the rider to grasp the handle 34 of the lever arm 26 in different places and thereby work out different muscles or different areas of muscles.

The lever arm 26 in the illustrated embodiment is bent back towards the rider. Obviously, the lever arm 26 may have many different configurations, depending on the location of the level arm 26 relative to the rider and the frame. Lever arm 26 pivotally connects to the frame 16 at pivot 40. The pivot 40 in an embodiment includes a bolt or rod that extends through two arms of the lever arm 26, which are disposed on either side of the frame 16. A nut or locknut threads onto the bolt and holds the dual arms of the lever arm 26 to the frame 16.

Figure 2:
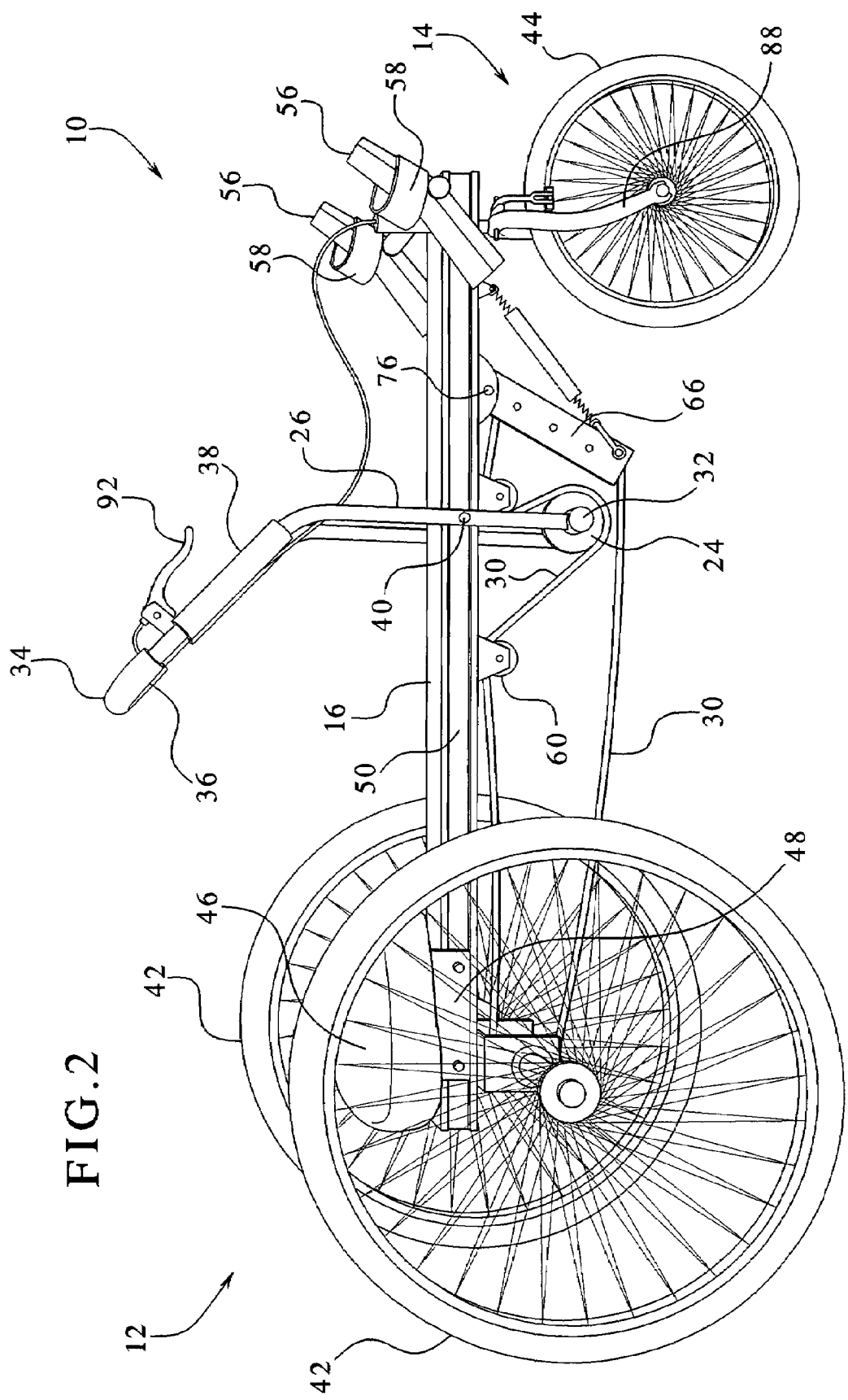
FIG. 2 is a perspective view of the three-wheeled embodiment of the vehicle and drive mechanism of the present invention, wherein the lever arm is substantially in a full rearward position, that is, in a position to be returned towards the front of the vehicle.

FIG. 1 illustrates the lever arm 26 in the full forward position, wherein the rider grasps the upper or lower grasping portion 36, 38 and pulls the lever arm 26 towards the rider's body. FIG. 2 illustrates the lever arm 26 in the full rearward position, wherein the end of the lever arm 26 connecting to the second free-wheel drive sprocket 24 at the pivot 32 points virtually directly downward. The lever arm 26 resides substantially perpendicular to the frame 16. In FIG. 2, the handle 36 of the lever arm 26 has been pulled backward substantially to its furthest possible point.

In operation, viewing the row vehicle 10 from its right side as illustrated in FIGS. 1 and 2, the first and second drive sprockets 22 and 24 rotate freely in the counterclockwise direction but cannot rotate in the clockwise direction. In this manner, viewing vehicle 10 from the right side as in FIGS. 1 and 2, when the rider pulls the handle 34 of the lever arm 26, the lever arm 26 pivots in a counterclockwise manner about pivot 40. Because the free-wheel drive sprocket 24 is constrained not to rotate in the clockwise direction, the drive sprocket 24 therefore imparts a force on the chain 30, which acts to pull the chain 30 downwardly and forwardly towards the front end 14 of the row vehicle 10. The free-wheel drive sprocket 24 pulls the chain 30 illustrated in FIG. 1 forward a distance as illustrated in FIG. 2.

Figure 4:
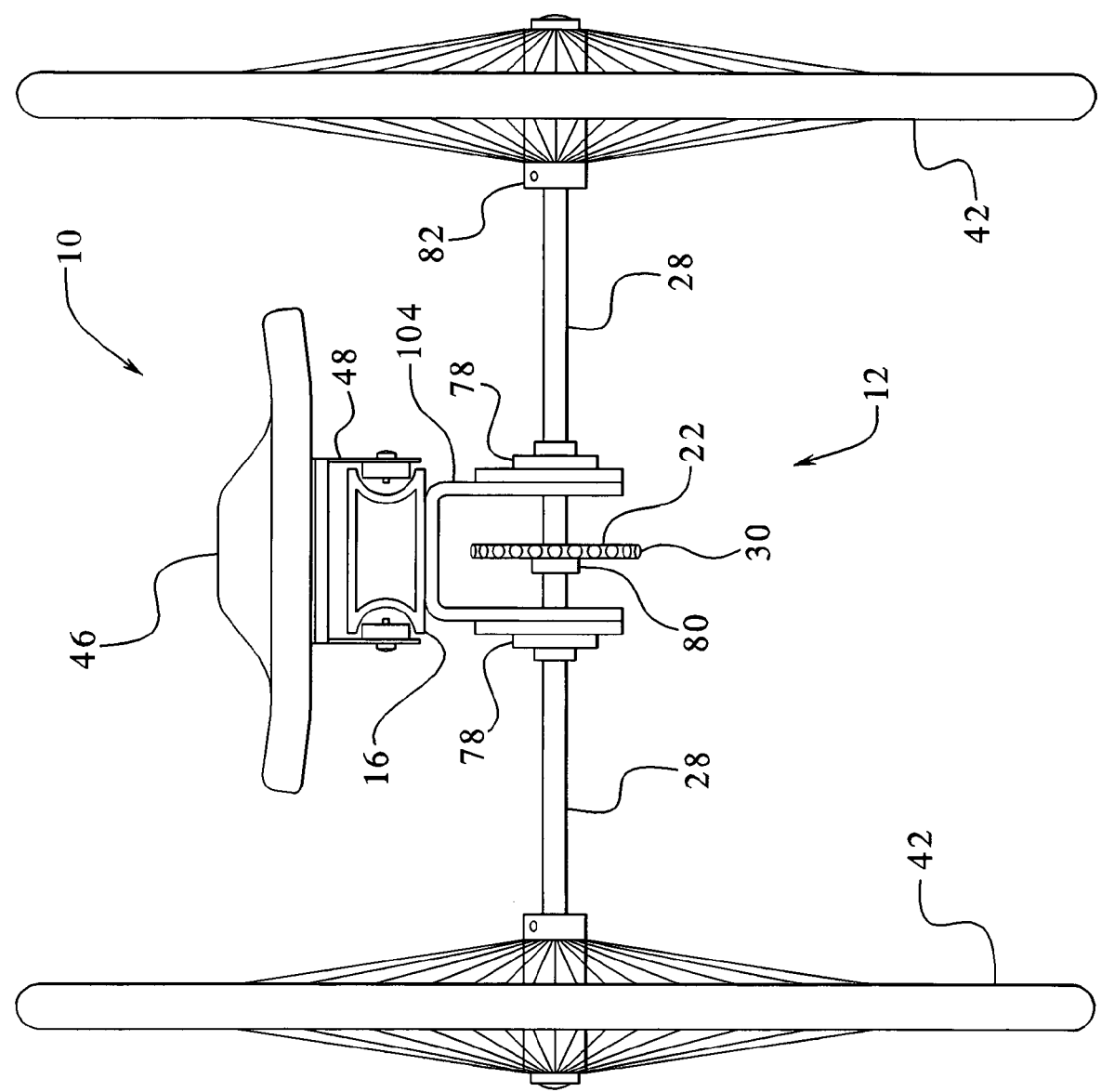
FIG. 4 is an elevation view from the rear end of the vehicle, which more closely shows the drive shaft, rear wheels and rear free-wheel drive sprocket of the drive mechanism of the present invention.

The chain 30 pulls the first free-wheel drive sprocket 22, illustrated in FIG. 4, which is connected to the drive shaft 28 at the rear end 12 of the row bike 10, wherein the chain 30 and sprocket 22 imparts a force on the drive shaft 28, so that the drive shaft 28 rotates the rear wheels forward. FIGS. 1, 2, 4, 5 and 6 illustrate a three-wheeled embodiment of the present invention. That is, row vehicle 10 includes two rear wheels 42 and a single steerable front wheel 44. In one preferred embodiment, one of the rear wheels 42 is fixed to the drive shaft 28, while the other rear wheel 42 rotates freely in either direction with respect to the drive shaft 28. This is preferred so that the three wheel design turns properly. Therefore, in operation as seen in FIG. 4, the chain 30 turns the first free-wheel drive sprocket 22, which in turn turns the drive shaft 28 and one of the rear wheels 42. The other rear wheel 42 turns due to the frictional force applied by the road to the free-spinning wheel 42.

The first and second free-wheel drive sprockets 22 and 24, as viewed from the right side of the vehicle 10, are free to rotate in the counterclockwise direction. Thus, in FIG. 2, when the rider pushes the handle 34 of the lever arm 26 forward, the second free-wheel drive sprocket 24 simply turns along the chain 30 and allows the lower end of the lever arm 26 to pivot about pivot 40 up to the position illustrated in FIG. 1. The drive sprocket 24 does not pull or impart a pulling force on the chain 30 when returning from the position in FIG. 2 to the position in FIG. 1. In this manner, the drive mechanism 20 of the row vehicle 10 enables the rider to reload or reposition the handle 34 of the lever arm 26 to once again be able to pull the chain 30 and move the row vehicle 10 forward.

A seat 46 slideably engages the frame 16. The seat 46 connects to a pair of brackets 48 (see FIGS. 1, 2 and 6), wherein brackets 48 slideably engage a groove 50 defined on both sides of the frame 16. The seat 46 slides back and forth along the frame 16 as the rider pulls the handle 34 of the lever arm 26 rearwardly and pushes the handle 34 forward. The rider slides forward when pushing the handle 34 forward and slides backward toward the rear end 12 when pulling the handle 34.

Figure 5:
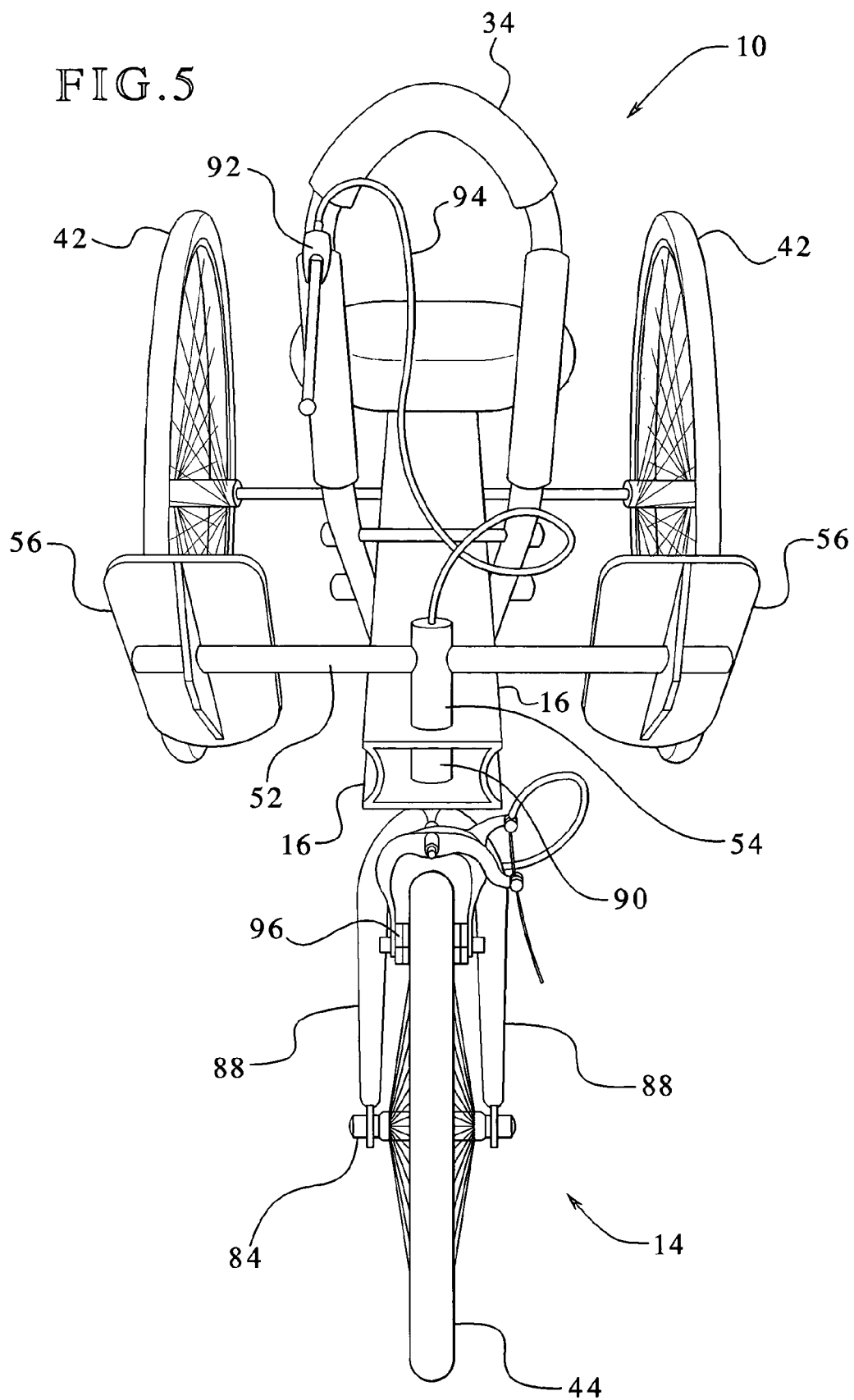
FIG. 5 is a perspective view from the front end of the vehicle, which more closely shows the front, steerable wheel, steering bar, steering column and foot pads of the present invention.

FIG. 5 illustrates that a steering bar 52 pivotally connects to the frame 16 at pivot 54. A pair of foot pads 56 pivotally connect to the steering bar 52 at both ends of same. The foot pads 56 include straps 58 (FIGS. 1 and 2), so that the rider can pull or push against the foot pads 56. Thus, when the rider pulls the handle 34 of lever arm 26 backward to thrust the vehicle 10 forward, the rider pushes against the foot pads 56. In doing so, the rider uses the rider's leg muscles to help pull the chain 30, to turn the rear drive wheel 42, and which also causes the seat 46 to slide backward along the frame 16. Conversely, when the rider pushes the handle 34 of the lever arm 26 towards the front end 14 of the row vehicle 10, the rider is able to pull against the straps 58 of the foot pads 56, which causes the seat 46 to slide forward along the frame 16 and put the rider in position to once again pull the handle 34.

Figure 3:
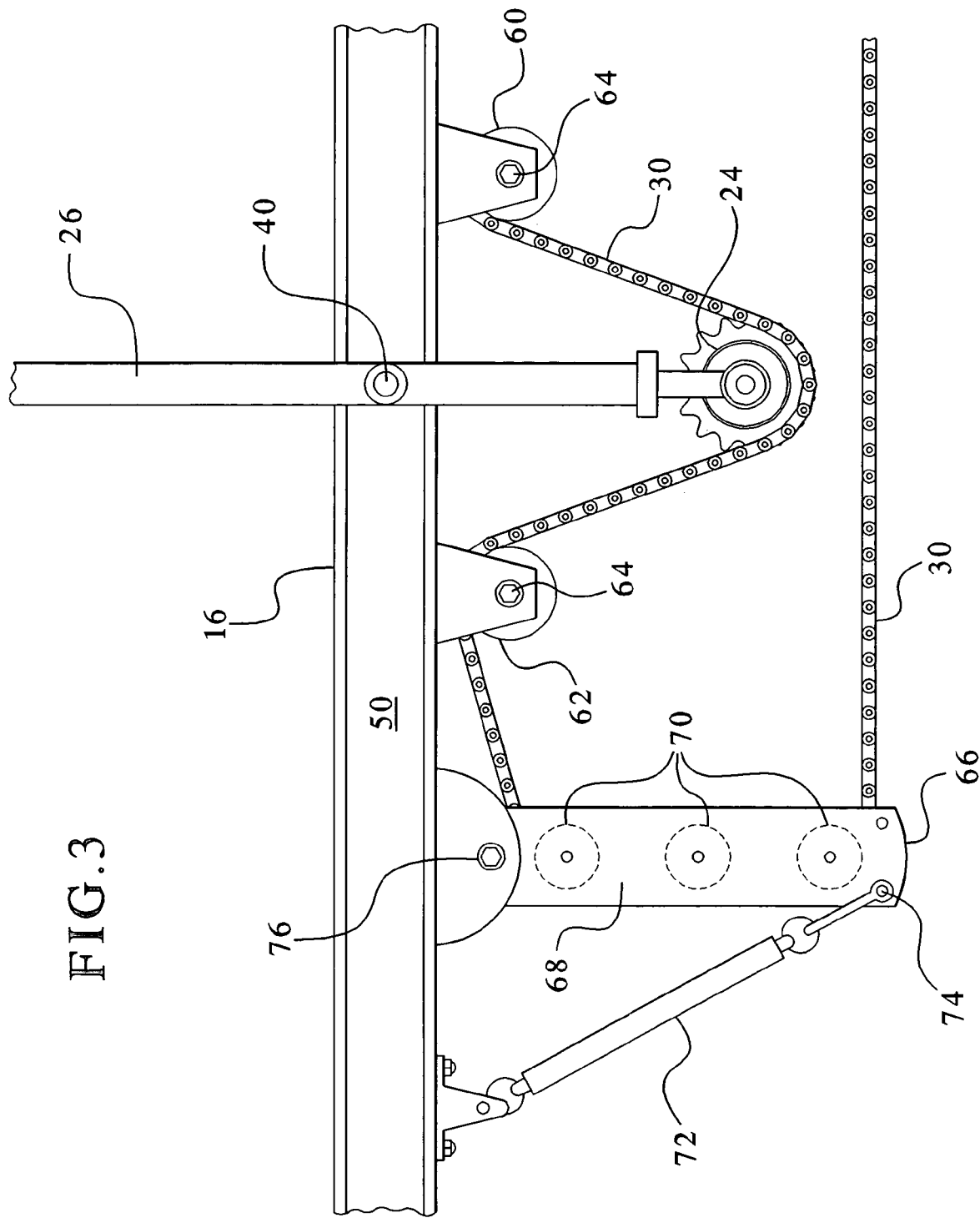
FIG. 3 is a fragmented elevation view, which more closely shows the rollers and front free-wheel drive sprocket of the drive mechanism of the present invention.

Referring now to FIG. 3, a close-up view of the second or front free-wheel drive sprocket 24 is illustrated. A first roller 60 and a second roller 62 attach to the frame 16. The first and second rollers 60 and 62 pivot about pivot points 64, which enable the chain 30 to roll over the rollers 60 and 62 in a substantially frictionless manner. In an embodiment, the first and second rollers 60 and 62 mount to the frame 16 on either side of the pivot 40 of the lever arm 26. It should be appreciated, however, that the pivot 40 could be positioned in alternative relationships to the first roller 60 and the second roller 62 such as being substantially closer to the first roller 60 or being placed on the forward side of the second roller 62.

The rollers 60 and 62 maintain one side of the loop of the chain 30 at or near the underside of the frame 16 and act to wrap the chain 30 around the drive sprocket 24. The first roller 60 also provides a fixed position against which the second free-wheel drive sprocket pulls the chain 30. That is, the roller 60 enables the chain 30 which runs substantially horizontally along with the frame 16 to turn at some varying angle over the roller 60. FIGS. 2 and 3 illustrate that when the lever arm 26 is in a pulled-back position towards the rear end 12, the roller 60 enables the chain 30 to make an approximately 45° angle with the frame 16. The roller 60 thereby acts to wrap the chain 30 around the free-wheel drive sprocket 24, so that the chain engages more teeth of same than would the chain 30 if the roller 60 did not exist. One suitable roller for the rollers 60 and 62 is an MRP Grooved Roller provided by Mountain Speed, Inc., Portland, Oreg.

FIG. 3 illustrates that the second roller 62 also wraps the chain 30 around the drive sprocket 24. The chain 30 then extends forward past the second roller 62, towards the front end 14 of the row vehicle 10, wherein the chain engages a tensioner 66. The tensioner 66 includes side plates 68 which hold a series of rollers 70. The chain 30 turns downwardly away from the frame 16 along the top roller 70, is guided by the middle roller 70 down towards the bottom roller 70, wherein the chain 30 turns to face the rear end 12 and returns substantially along the length of the frame 16 to the first free-wheel drive sprocket 22. In this manner, chain 30 creates a loop.

As seen in FIG. 3, a biasing mechanism 72 pivotally attaches to the frame 16 and to the tensioner 66 at pivot point 74. In one embodiment, the biasing mechanism 72 includes a tensioning spring selected to have a desired spring rate or spring constant. In an alternative embodiment, the biasing mechanism 72 includes a piston/cylinder device. Both types of biasing mechanisms are well known to those of skill in the art. Further, it is common to pivotally attach such biasing mechanisms between hinged members. In the illustrated embodiment of FIGS. 1 to 3, the biasing mechanism 72 includes a tension spring and a plastic or otherwise protective covering over the majority of the spring.

As illustrated in FIG. 1, when the handle 34 of the lever arm 26 is in the forwardmost pulling position, the tensioner 66 extends substantially perpendicular from the frame 16 and the tensioning spring 72 is in a relatively relaxed position. In FIGS. 2 and 3, when the handle 34 of the lever arm 26 has been pulled to a substantially rearmost position, the force of the chain 30 rotates the tensioner 66 about pivot point 76 linking the tensioner 66 to the frame 16. The rotation of the tensioner 66 pulls the spring 72 and also rotates the spring 72 slightly about the pivot point 74 relative to the tensioner 66.

When the rider pushes the handle 34 of the lever arm 26 forward towards the position shown in FIG. 1, the biasing mechanism 72 automatically pulls the tensioner 66 so that the tensioner 66 rotates about pivot point 76 back to its substantially perpendicular position, which maximizes the vertical distance that the bottom of chain 30 can extend beneath the frame 16. In essence, the tensioner 66 ensures that the chain 30 clears the second free-wheel drive sprocket 24 when the sprocket 24 pivots towards it lowest position, as shown in FIGS. 2 and 3.

Referring now to FIG. 4, a pair of bearings 78 hold the drive shaft 28 in a rotational relationship with respect to the frame 16. The bearings 78 are attached to the frame 16 by any suitable means. The first free-wheel drive sprocket 22 attaches to the drive shaft 28 via a hub 80. The shaft 28 defines a keyway (not illustrated) which frictionally accepts a portion of the key. The hub 80 also defines a keyway (not illustrated) which accepts another portion of the key (not illustrated). The key and keyway provide a well-known means for attaching the hub 80 to the drive shaft 28. The drive sprocket 22 rotates freely in one rotational direction with respect to the hub 80 and the drive shaft 28 but is not able to rotate in both directions with respect to same. FIG. 4 illustrates that the right rear wheel 42 includes a bearing 82, which enables the right rear wheel 42 to rotate freely in both directions with respect to the drive shaft 28. The left rear wheel 42 fixedly attaches to the drive shaft 28, so that the wheel 42 turns as the drive shaft 28 turns.

Referring now to FIG. 5, a view of the three-wheeled vehicle 10 from the front end 14 is illustrated. FIG. 5 illustrates that an axle 84 of the single front-wheel 44 attaches on both ends to a set of forks 88. The forks 88 come together and fix to a steering column 90 which extends through the frame 16. The steering column 90 pivots horizontally with respect to the frame 16 via pivot 54. The steering column 90 mechanically links to the steering bar 52.

The rider steers the vehicle 10 by applying pressure to one of the footpads 56, which in turn rotates the steering bar 52 about the pivot 54. The rider uses the rider's right leg to rotate the steering bar 52 in a counter-clockwise manner with respect to the rider, so that the front wheel 44 turns left. Conversely, the rider uses the rider's left leg to press the left footpad 56, so that the steering bar 52 rotates clockwise with respect to the rider, wherein the front wheel 44 thereby turns to the right. The foot controlled steering of the vehicle 10 enables the rider to pull or push the handle 34 of the lever arm 26 independent of the steering function performed by the steering bar 52 and front steerable wheel 44.

FIGS. 1, 2 and 5 illustrate that a brake lever 92 mounts to the handle portion 34 of the lever arm 26. The brake lever 92 enables the rider to place tension on a brake cable 94 to thereby close a pair of brake pads 96 which frictionally engage the front steerable wheel 44. This action causes the braking of the vehicle 10 as is well known in the art. The single brake pads 96 in an alternative embodiment mount adjacent to one of the rear wheels 42. The illustrated embodiment in FIGS. 1, 2 and 5 show a single brake lever 92 and a single pair of brake pads. It should be appreciated, however, that a second brake lever could additionally be attached to the handle portion 34 of the lever 26, which would enable the rider to tension a second brake cable that would run to a second pair of brake pads positioned and arranged to frictionally engage one of the rear wheels 42.

Figure 6B:
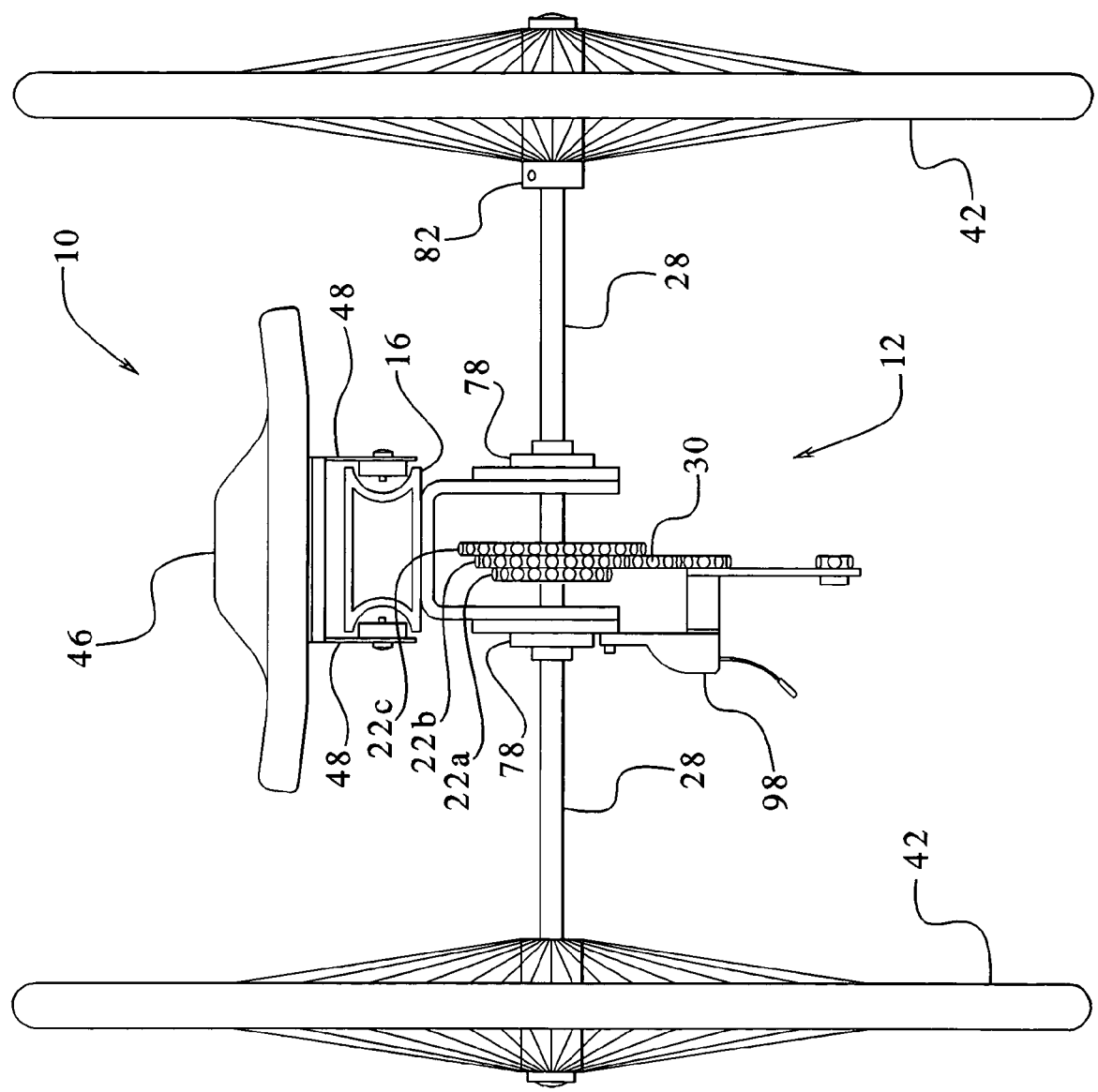
FIG. 6B is an elevation view from the rear end of the three-wheeled vehicle that illustrates the embodiment for the gear shift mechanism discussed in connection with FIG. 6A.

Referring now to FIGS. 6A and 6B, the three-wheeled vehicle 10 is illustrated having a gear shift derailer 98. In one embodiment, the hub 80 of the first free-wheel drive sprocket 22 connects to a multitude of different sized sprockets. The different sizes of sprockets provide a different gear ratio between the second free-wheeled drive sprocket 24, which mounts to the lever arm 26, and the first free-wheel drive sprocket 22. Generally, the smaller the sprocket driving the rear wheel 42, the harder the sprocket will be to turn but the more revolutions or fraction of a revolution the wheel 42 will make per stroke of the lever arm 26. By providing a multitude of different sized sprockets, the vehicle 20 can start out with the chain 30 being tensioned about a larger sprocket, so that the vehicle 10 is easier to move initially. Once the vehicle 10 has obtained a certain speed and a certain amount of momentum, the gear shift derailer 98 enables the rider to switch the gear ratio, so that the same stroke of the lever arm 26 produces more turn of the wheel 42.

The derailer 98 includes any derailer for bicycles known to those of skill in the art. In an embodiment, the derailer 98 mounts to a plate supporting one of the bearings 78. The derailer 98 alternatively mounts to a channel 104 that bolts to the underside of the frame 16 and extends downwardly to mount the bearings 78. The derailer further alternatively can mount directly to the underside or the back of the frame 16, so that the seat 46 is still enabled to slide freely back and forth.

The operator controls the shifting of gears via a gear shift lever 100, which attaches to the handle portion 34 of the lever arm 26. In a similar manner as described above with the operation of the brake, the gear shift lever 100 controls the tensioning of a gear cable or link 102, so that the lever 100 pulls the gear cable or link 102 to cause the derailer 98 to change position and pull the chain 30 from one sized sprocket to another. The gear shift lever 100, unlike the brake cable lever 92, is bi-directional so that the rider can switch gears in both directions, i.e., switch to a lower more easily turning gear or switch to a higher speed gear. FIG. 6B illustrates one embodiment having three gears that are established by three different rear drive sprockets 22a to 22c.

Figure 7:
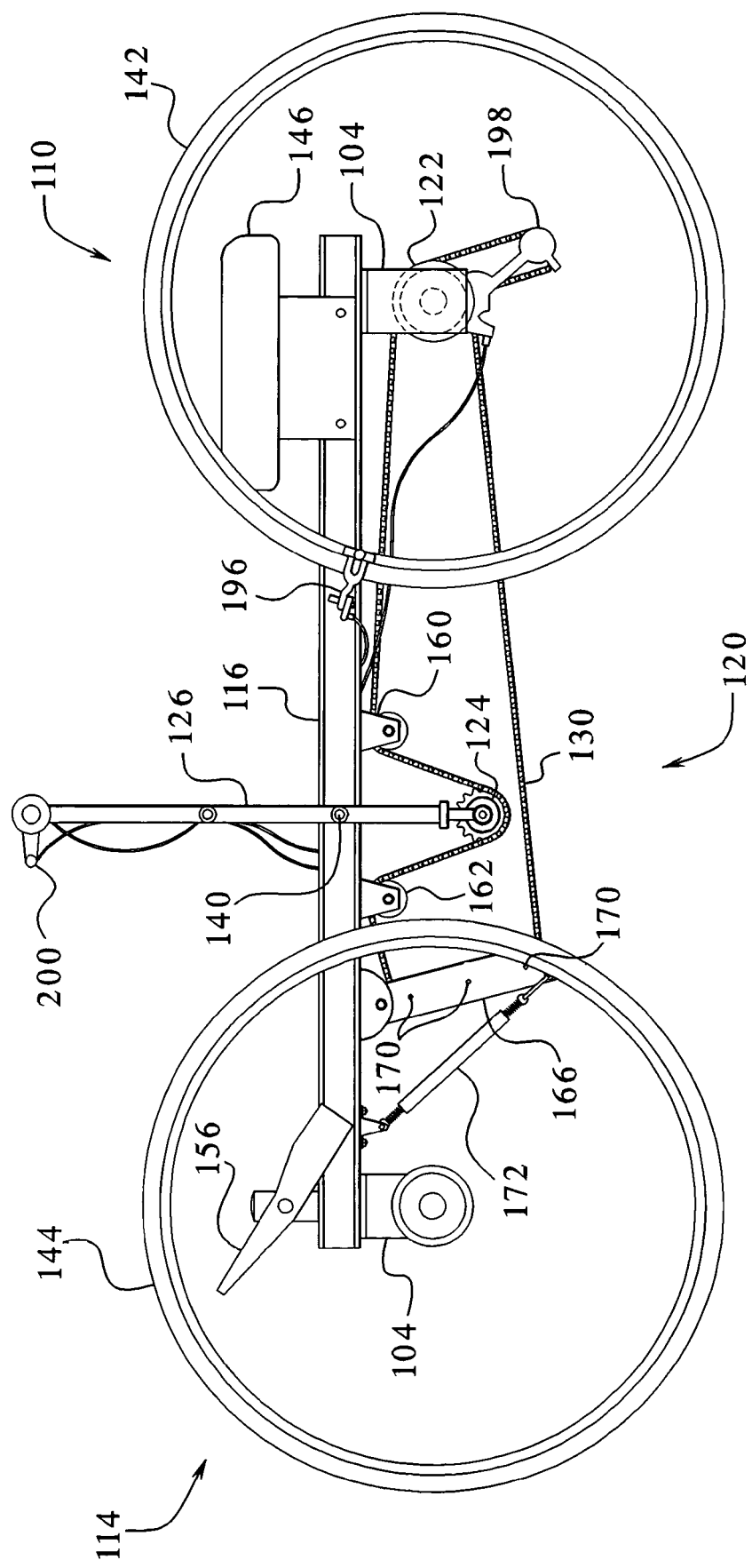
FIG. 7 is an elevation view of a four-wheeled vehicle of the present invention including a gear shift mechanism.
Figure 8:
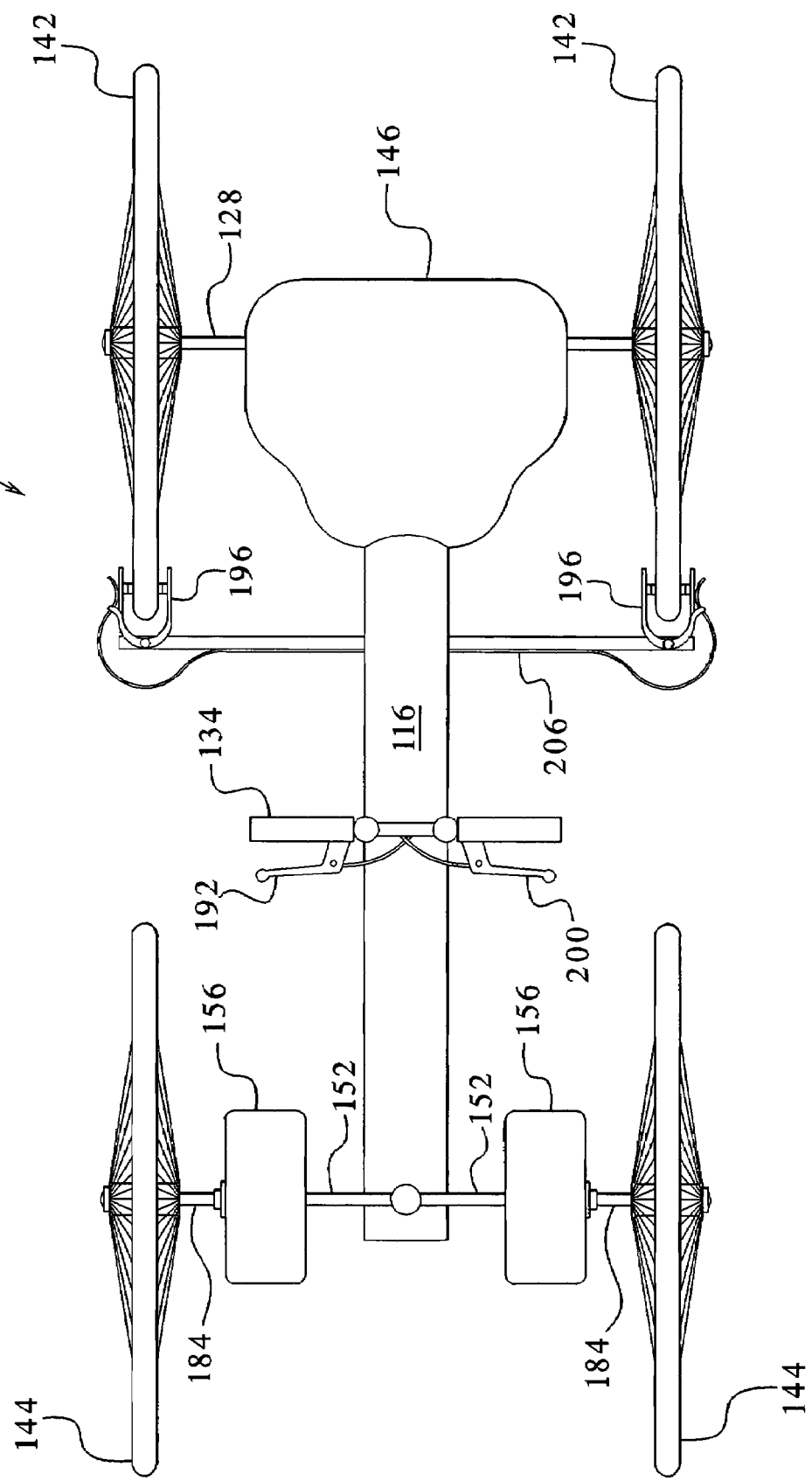
FIG. 8 is a top plan view of the four-wheeled vehicle of FIG. 7.

Referring now to FIGS. 7 and 8, a four-wheeled vehicle 110 employing a drive mechanism 120 of the present invention is illustrated. The four-wheeled vehicle 110 includes each of the major functioning components described above for the three-wheeled vehicle 10. The drive mechanism 120 operates exactly the same as the drive mechanism 20 of the three-wheeled vehicle 10. In particular, the drive mechanism 120 drives one rear wheel 142 as described above. The drive mechanism 120 includes a first free-wheeled drive sprocket 122 and a second free-wheeled sprocket 124, which operate the same as the first and second drive wheels 22 and 24 of the vehicle 10. The second free-wheeled drive sprocket connects to one end of a lever arm 126, which pivots about a pivot 140 connecting the lever arm 126 to the frame 116.

First and second rollers 160 and 162 enable the chain 130 to change angle and thereby engage more teeth of the drive sprocket 124. A tensioner 166 directs the chain 130 to extend beneath the drive sprocket 124 at all times and feeds the chain 130 back up along a set of rollers 170 towards the underside of the frame 116, wherein the chain is enabled to create a loop. A biasing mechanism 172 pivotally attaches to the frame 116 and the tensioner 166 so that the tensioner 166 automatically pivots towards a perpendicular position with respect to the frame 116 when the rider pushes the lever arm 126 towards a front end 114 of the four-wheeled vehicle 110.

The rider operates the four-wheeled vehicle 110 by sitting on a slideable seat 146 and by pushing and pulling against a set of foot pads 156. The four-wheeled vehicle 110 also includes the braking mechanism and a gear shift derailer 198 as described above.

The primary difference between the four-wheeled vehicle 110 and the three-wheeled vehicle 10 is that the channel or mount 104, which only mounts to the rear end of the frame 16 to hold the rear wheels 42 of the vehicle 10 as best seen in FIG. 6A, additionally mounts to the front end of the frame 116 to hold the dual front wheels 144 of the four-wheeled embodiment of the vehicle 110. Also, as illustrated in FIG. 7, the four-wheeled vehicle 110 does not include a set of forks to hold front wheels 144 as in the three-wheeled vehicle 10.

Without the forks, the four-wheeled vehicle 110 requires a member to extend outwardly from the frame 116 and attach to brake pads 196, which in the illustrated embodiment stop one or both of the rear-wheels 142. That is, because there is no centrally located wheel in the four-wheeled embodiment, the brake pads 196 must offset laterally from the frame 116. FIG. 8 illustrates that a member 206 extends from the frame 116. The member 206 supports two pairs of brake pads 196. The handle portion 134 of the lever arm 126 as illustrated in FIG. 8 includes a brake lever 192 that operates the left and right brake pads 196 and a gear shift lever that operates the derailer 198.

Steering the four-wheeled vehicle 110 occurs in substantially the same manner as described above for the three-wheeled vehicle 10. The front wheels 44 attach to an axle 184, which spaces apart the front wheels 144 in the same manner that the drive shaft 128 spaces apart the rear wheels 142. The axle 184 connects to a steering column, not illustrated, which extends vertically upward through the extra support channel 104 and through the frame 116. The steering column mechanically connects to a steering bar 152, which supports the pivotally attached foot pads 156 at both ends.

When the rider presses the right foot pad 156, the steering bar 152 rotates in a counter-clockwise direction with respect to the rider and causes the steering column to likewise rotate in a counter-clockwise manner, which causes the axle 184 and the front wheels 144 to turn to the left. Conversely, when the rider presses the left foot pad 156, the steering bar 152 and steering column rotate clockwise with respect to the rider, wherein the axle 184 and front wheels 144 turn to the right accordingly. It should be appreciated that the four-wheeled vehicle 110 is readily adapted to a wheelchair by removing the foot steering mechanisms and by repositioning the orientation of the person or rider to an upright sitting position.

Figure 9:
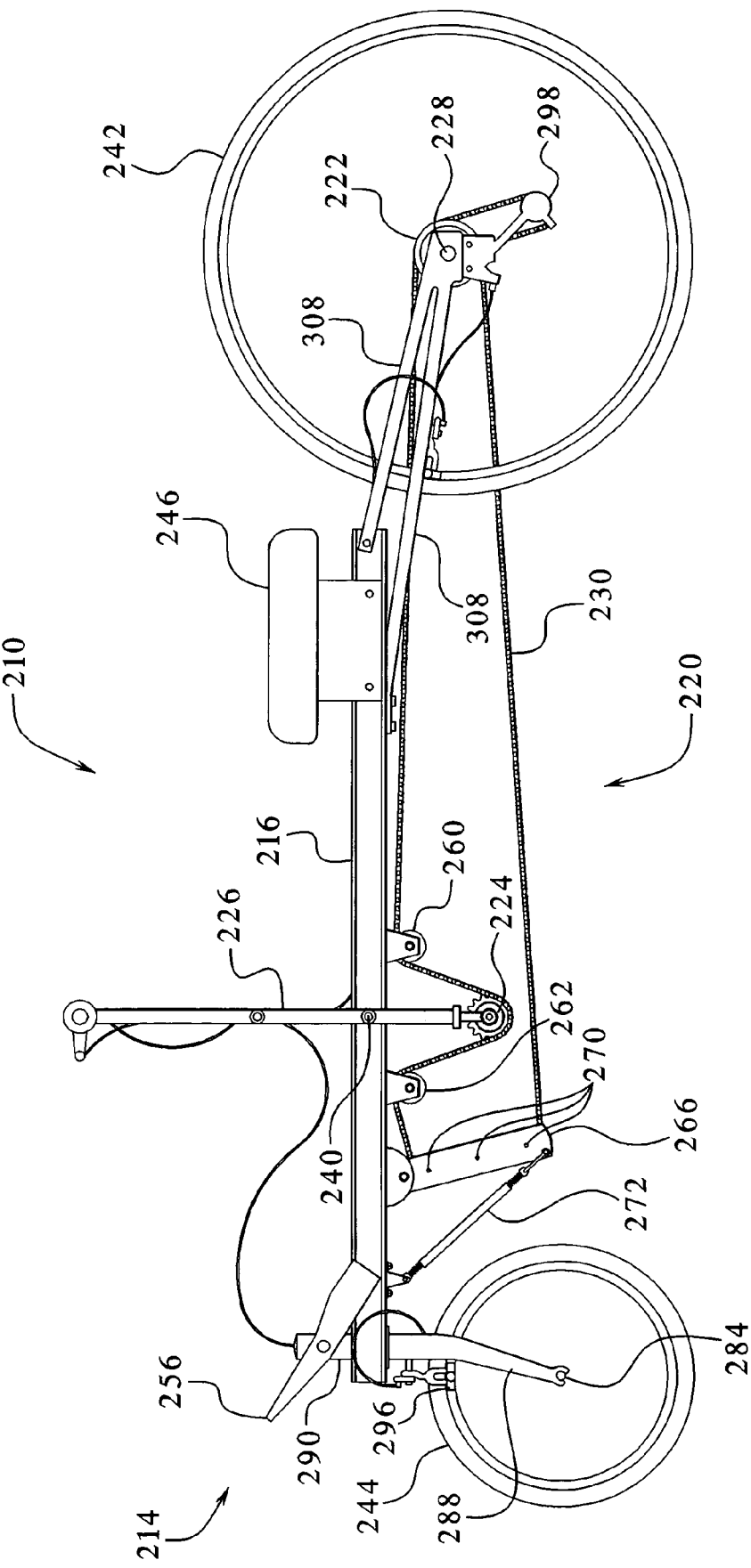
FIG. 9 is an elevation view of a two-wheeled vehicle of the present invention including a gear shift mechanism.
Figure 10:
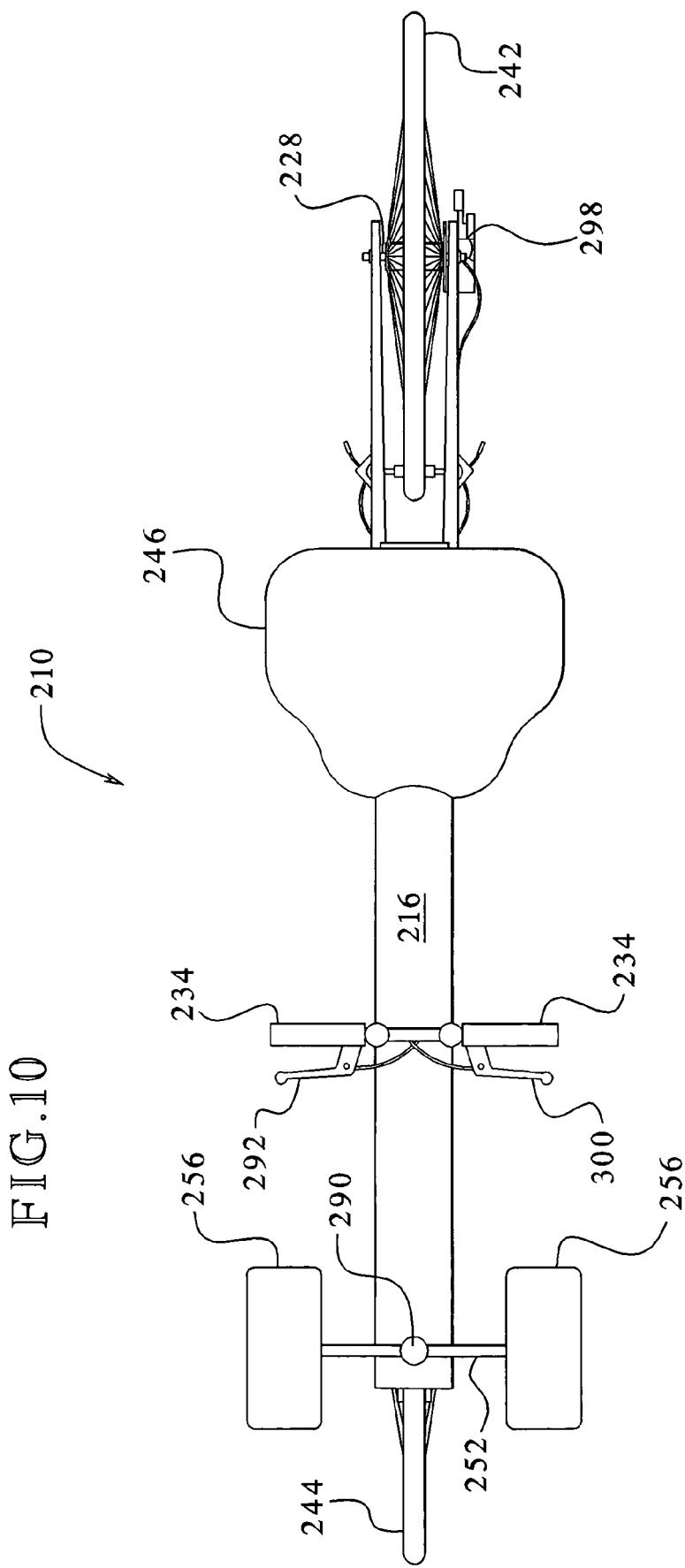
FIG. 10 is a top plan view of the two-wheeled vehicle of FIG. 9.

Referring now to FIGS. 9 and 10, a two-wheeled vehicle 210 employing a drive mechanism 220 of the present invention is illustrated. The two-wheeled vehicle 210 includes each of the major functioning components described above for the three-wheeled vehicle 10. The drive mechanism 220 operates exactly the same as the drive mechanism 20 of the three-wheeled vehicle 10. In particular, the drive mechanism 220 drives the single rear wheel 242 as described above. The drive mechanism 220 includes a first free-wheeled drive sprocket 222 and a second free-wheeled sprocket 224, which operate the same as the first and second drive's wheels 22 and 24 of the vehicle 10. The second free-wheeled drive sprocket connects to one end of a lever arm 226, which pivots about a pivot 240 connecting the lever arm 226 to the frame 216.

First and second rollers 260 and 262 enable the chain 230 to change angle and thereby engage more teeth of the drive sprocket 224. A tensioner 266 directs the chain 230 to extend beneath the drive sprocket 224 at all times and feeds the chain 230 back up along a set of rollers 270 towards the underside of the frame 216, wherein the chain is enabled to create a loop. A biasing mechanism 272 pivotally attaches to the frame 216 and the tensioner 266 so that the tensioner 266 automatically pivots towards a perpendicular position with respect to the frame 216 when the rider pushes the lever arm 226 towards a front end 214 of the two-wheeled vehicle 210.

The rider operates the two-wheeled vehicle 210 by sitting on a slideable seat 246 and by pushing and pulling against a set of foot pads 256. In an alternative embodiment, the foot pads 256 are positioned lower and more towards the center of the vehicle 210 than shown in FIG. 9, so as to provide more stability than the illustrated embodiment of the vehicle 210. The four-wheeled vehicle 210 also includes the braking mechanism and a gear shift derailer 298 as described above.

The primary difference between the two-wheeled vehicle 210 and the three-wheeled vehicle 10 is that the channel or mount 104, which mounts to the rear end of the frame 16 to hold the rear wheels 42 of the vehicle 10 as best seen in FIG. 6A, is not provided on the two-wheeled vehicle 210. The rear wheel 242 mounts to the frame 216 via a multitude of struts 308, which securely and rotatably fasten to a drive shaft 228, which drives the rear wheel 242.

The two-wheeled vehicle 210 includes a set of forks 288 that hold the front wheel 244 as is present in the three-wheeled vehicle 10. The handle portion 234 of the lever arm 226 as illustrated in FIG. 10 includes a brake lever 192 which operates the brake pads 296 positioned around the front wheel 244. The handle portion 234 also includes a gear shift lever 300 that operates the derailer 298.

Steering the two-wheeled vehicle 210 occurs in substantially the same manner as described above for the three-wheeled vehicle 10. The front wheel 244 attaches to an axle 284, which can be a standard bicycle axle. The forks 288 come together and fix to a steering column 290, which extends through the frame 216 in a similar manner as with the vehicle 10. The steering column 290 pivots horizontally with respect to the frame 216 via a pivot point. The steering column 290 connects to a steering bar 252.

The steering bar 252 supports pivotally attached foot pads 256 at both ends. When the rider presses the right foot pad 256, the steering bar 252 rotates in a counter-clockwise direction with respect to the rider and causes the steering column to likewise rotate in a counter-clockwise manner, which causes the axle 284 and the front wheel 244 to turn to the left. Conversely, when the rider presses the left foot pad 256, the steering bar 252 and steering column rotate clockwise with respect to the rider, wherein and the axle 284 and front wheel 244 turn to the right accordingly.

As described above, in one embodiment, the rider steers vehicles 10, 110 and 210 with the rider's feet. The present invention also includes a multitude of embodiments where the rider alternatively steers the vehicles 10, 110 and 210 with the rider's arms and hands, using the lever arm and handle. The embodiments shown below for such steering apply to any of the two, three or four-wheeled embodiments disclosed herein. Each of the embodiments is also operable with the braking and gear shift mechanisms described herein.

Figure 11:
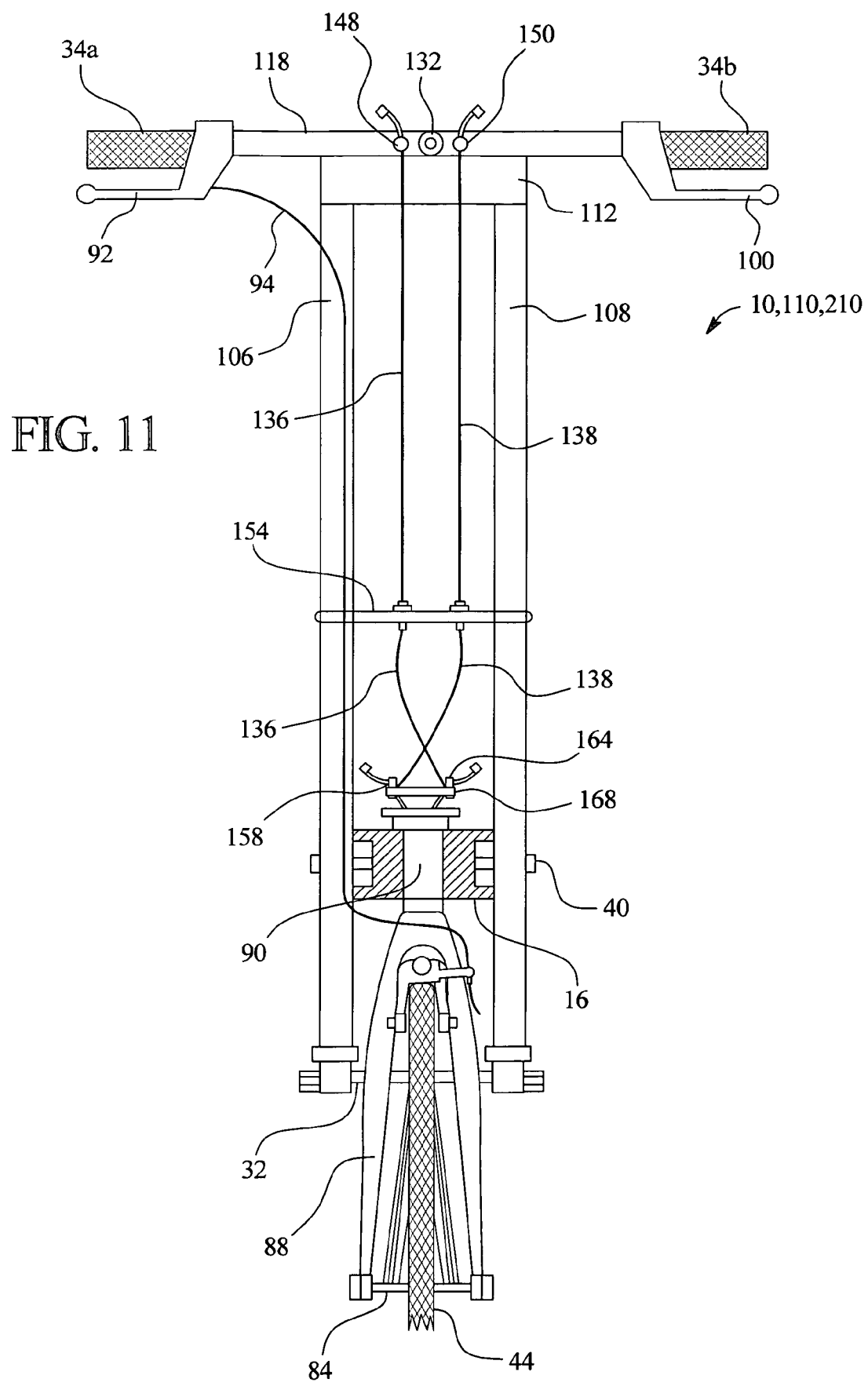
FIGS. 11 to 13 illustrate one embodiment for a hand-operated steering mechanism, which operates with the lever arm and employs a cabling system.
Figure 12:
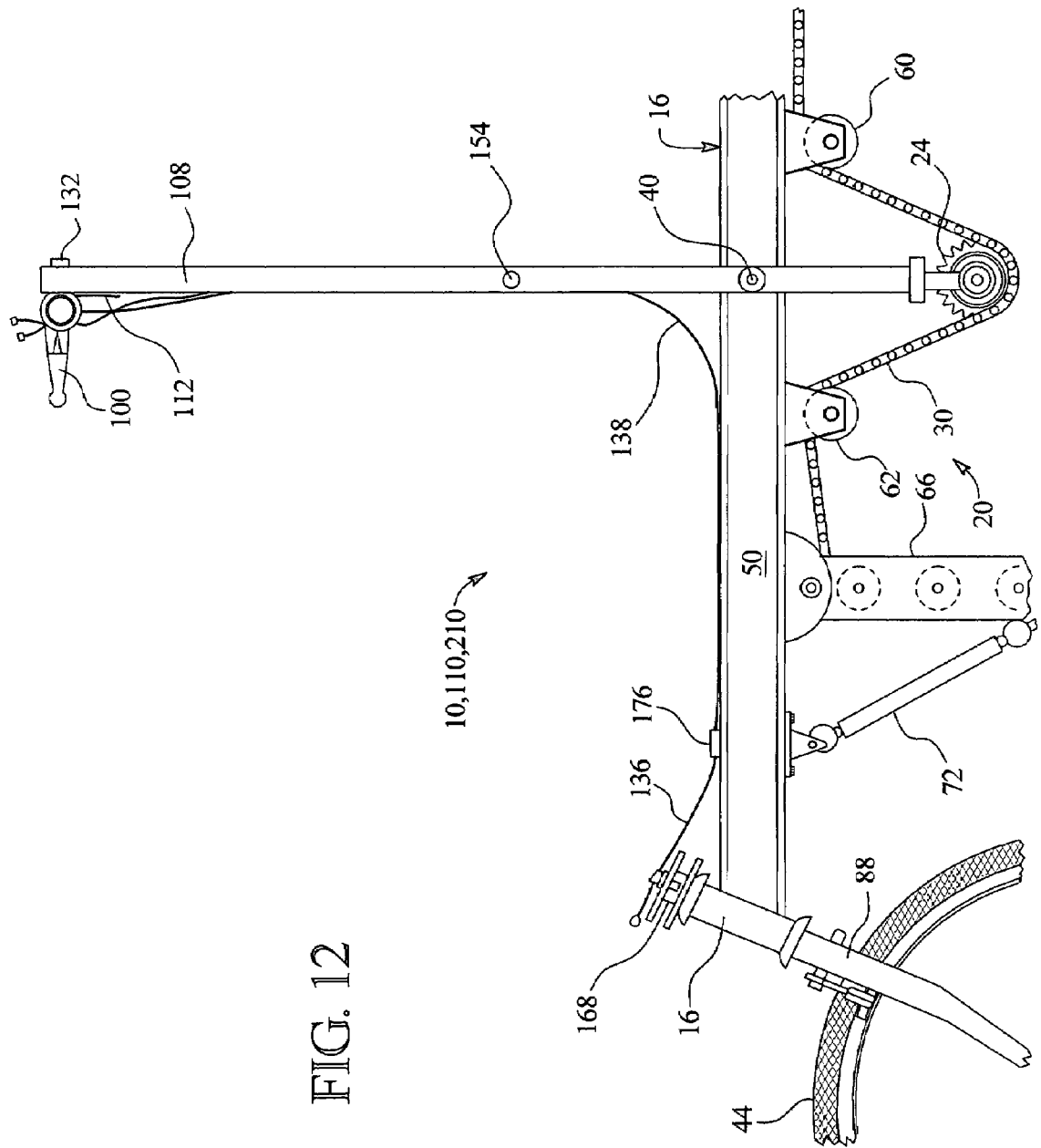
Figure 13:
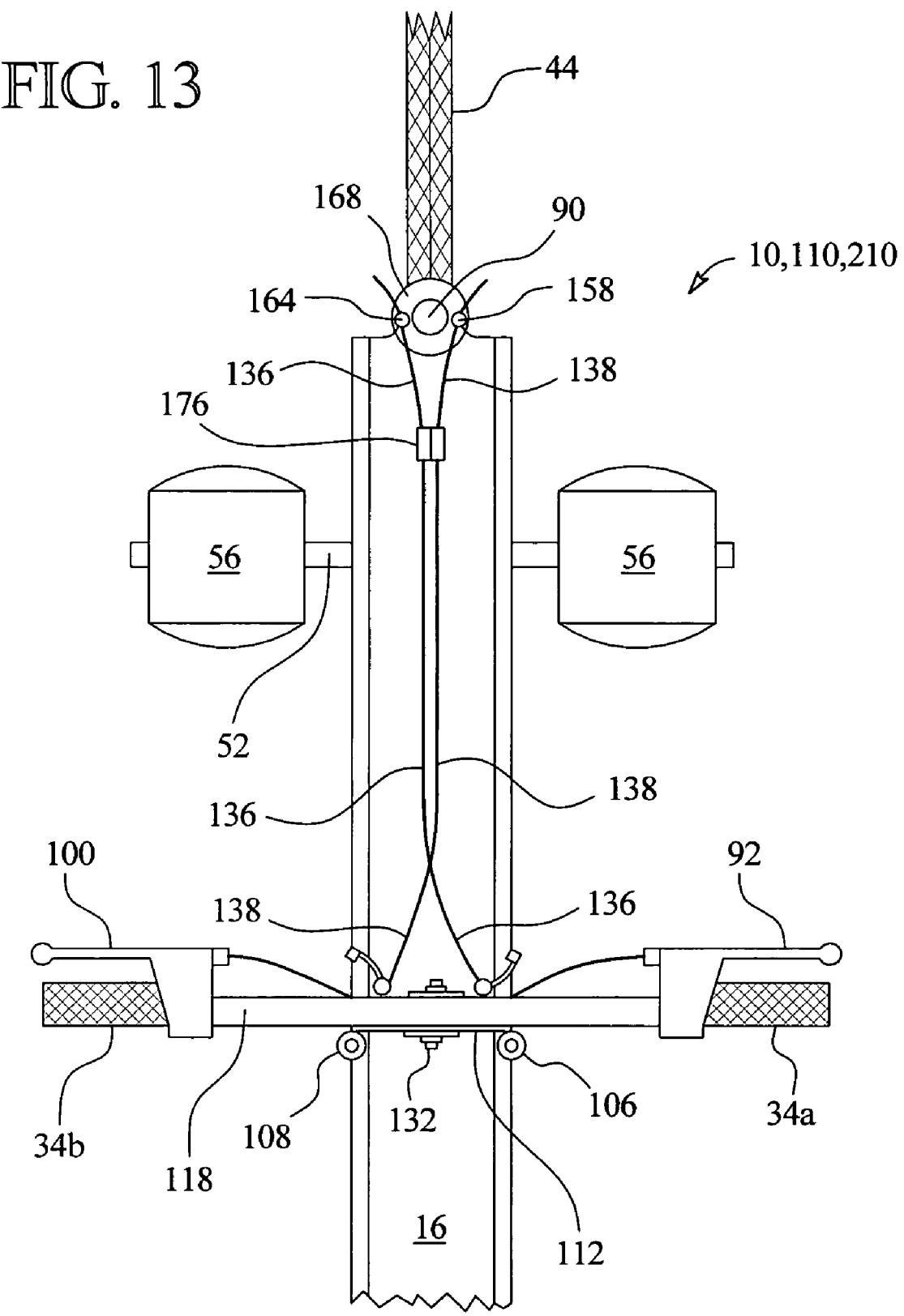

FIGS. 11 to 13 illustrate one embodiment where the rider steers vehicle 10, 110 and 120 using the lever arm, handles and cables 136 and 138. For reference, many of the same components having the same element numbers discussed above are used with this alternative steering mechanism. Namely, FIGS. 11 to 13 show front tire 44, forks 88, axle 84, frame 16 and other components described above in connection with drive mechanism 20. A lever arm that differs from lever arm 26 is employed. Here, the lever arm includes two tubes or members 106 and 108 that extend from pivot 32, which supports free wheel driver 24, to a mounting plate 112. The tops of tubes 106 and 108 are fastened or welded to plate 112. Tubes 106 and 108 are also pivotally connected to frame 16 via pivot 40.

A steering bar 118 is rotatably mounted to plate 112 via fastener 132. Fastener 132 can include, for example, a bolt, a series of washers and a locking nut (e.g., a nut with a nylon insert), which hold steering bar 118 to plate 112, but allow steering bar 118 to be rotated in a relatively vertical plane highlighted by the arrows on FIG. 11. The steering motion of the cabling embodiment of FIGS. 11 to 13 is more like that of an automobile than that of bicycle steering. That is, the movement of rotating bar 118 is clockwise or counter-clockwise in a substantially vertical plane if the tubes 106 and 108 are upright or at some angled plane with respect to pivot 40 during the pulling and pushing of tubes 116 and 118. To turn vehicle 10, 110 and 210, steering bar 118 is rotated throughout the pulling and pushing of the rowbike in a plane that is substantially parallel to the plane defined by tubes 106 and 108.

Handles 34a and 34b connect to the ends of steering bar 118 and enable the rider to comfortably turn bar 118. As described above, a brake lever 92 is provided with handle 34a to pull a brake cable 94 when operated to brake vehicle 10, 110 or 210. A gear shift 100 is provided with handle 34b to shift gears of a multi-gear version of the vehicle. Brake lever 92, cable 94 and gear shift 100 are not shown with each of the hand steering embodiments described herein, however, they are operable with each such embodiment.

Cables 136 and 138 are attached to steering bar 118 via fasteners 148 and 150, respectively. Fasteners 148 and 150 can be any suitable type of fastener, such as a clip, spring clip. Cables 136 and 138 run from fasteners 148 and 150 to a tensioning bar 154. Tensioning bar 154 helps to hold cables 136 and 138 in place adjacent tubes 106 and 108 as vehicle 10, 110 and 201 is operated and also helps to maintain a proper and desired tension on cables 136 and 138.

As seen in FIGS. 11 to 13, cables 136 and 138 bend and extend along tubes 136 and 138 as well as frame 16. FIGS. 11 and 13 also show that cables 136 and 138 cross over one another so that turning the wheel clockwise (from the rider's perspective) turns wheel 44 and vehicle 10, 110 and 210 to the right, while turning steering bar 118 in the counterclockwise direction, turns wheel 44 and vehicle 10, 110 and 210 to the left. Such turning is similar to that of an automobile. Cables 136 and 138 are also held against frame 16 in one or more places by clips 176. Clips 176 hold cables 136 and 138 in a proper position and maintain proper tension. Cables 136 and 138 can be any suitable aircraft or braking cable, such as a seven by seven stranded aircraft cable, e.g., 0.063 inch (1.6 mm) diameter.

Cables 136 and 138 fasten via fasteners 164 and 158, respectively, to a pulley or collar 168. Collar 168 in turn is connected, directly or indirectly, to steering column 90. Steering column 90 is held in place by frame 16. Steering column 90 also connected to or made integral with forks 88. Forks 88 hold axle 84, which is affixed to the spokes of wheel 44.

The rider's twisting of steering bar 118 imparts a tension on one of the cables 136 and 138, which in turn pulls on one of the fasteners 164 or 158. That pulling force causes pulley or collar 168 to turn. The turning of pulley or collar 168 in turn rotates steering column 90, causing wheel 44 and vehicle 10, 110 and 210 to turn in the desired direction.

Referring now to FIGS. 14 to 18, an alternative hand steering system is provided for vehicles 10, 110 and 210. Here, the turning of steering bar 118 is performed in a more conventional bicycle style, e.g., horizontal, manner. Steering column 118 turns in a plane that is substantially perpendicular to alternative lever arm 180, regardless of the position that the lever arm is in during the operation of rowbike 10, 110 or 210. Lever arm 180 includes forks 186 and 188 and a tubular stem 182, which extends upward from forks 186 and 188 to steering bar 118. Forks 186 and 188 are rotatably connected to frame 16 via bolts or fasteners 280 and 282. Bolts 280 and 282 thread into threaded rod or shaft 286, which is fixed to frame 16. Bolts 280 and 282, threaded rod 286 and associated bearings collectively make-up one embodiment for pivot 40 described throughout this specification. Forks 186 and 188 also connect to pivot 32, which supports free wheel driver 24.

Figure 17:
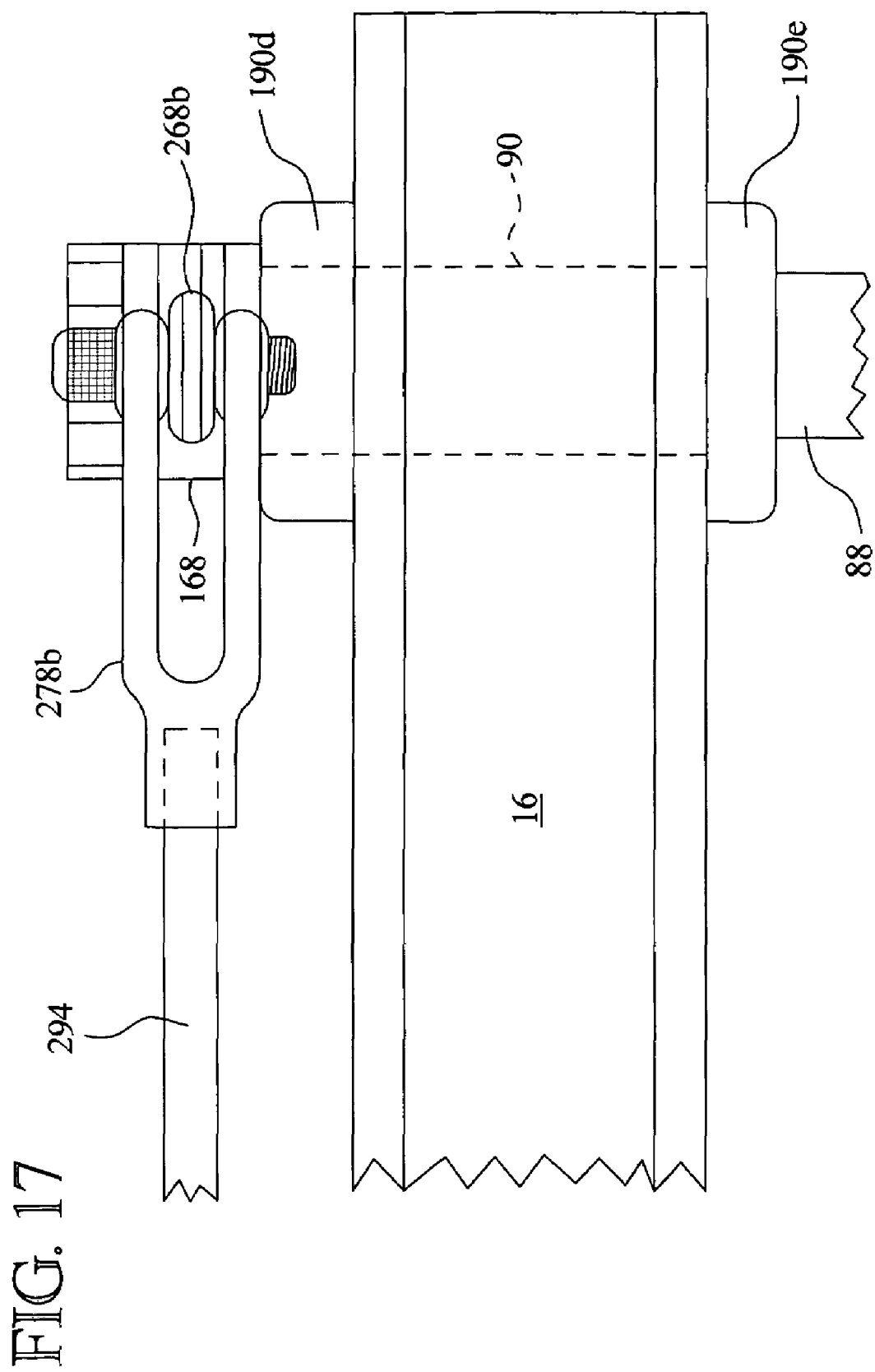
FIGS. 17 and 18 illustrate side and top views, respectively, of a portion of the front end of the vehicle of the present invention showing a steering linkage used in the embodiments shown in (i) FIGS. 14 to 16, (ii) FIGS. 19 to 21 and (iii) FIG. 22.
Figure 18:
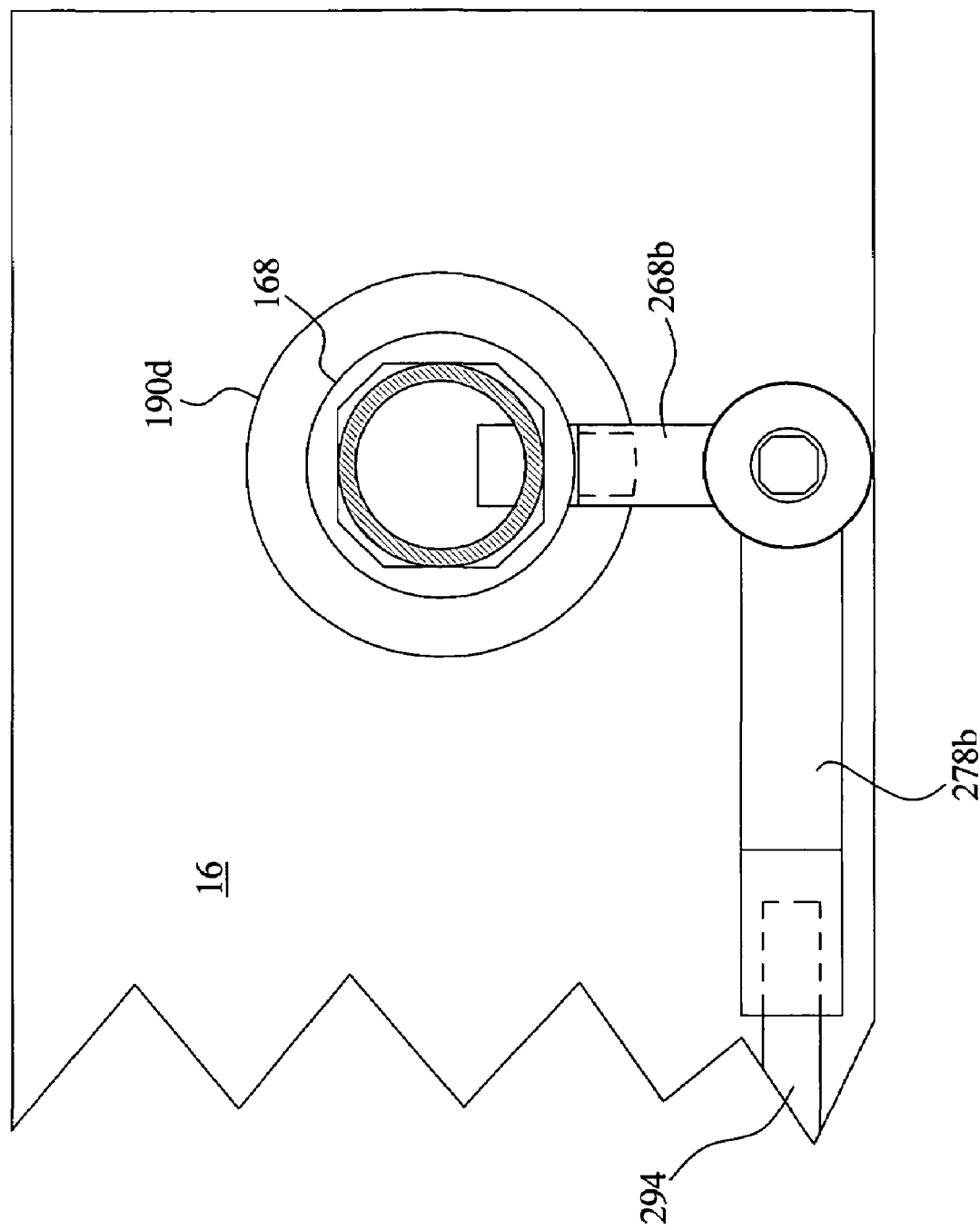

The steering mechanisms of FIGS. 14 to 16, 19 to 21 and 22 each include a member that can twist or turn to transfer torque from the rider to steering column 90. Also, the members each have to be able to pivot or bend to compensate for the pivoting motion of lever arm 180. The apparatus shown and discussed in FIGS. 17 to 18 applies to each of the embodiments disclosed in (i) FIGS. 14 to 16, (ii) FIGS. 19 to 21 and (iii) FIG. 22. FIGS. 17 and 18 show the steering apparatus at the front of vehicles 10, 110 and 210, which is the same for each of the three embodiments. The embodiments differ in the structure used for the twisting, bending and pivoting member.

Figure 14:
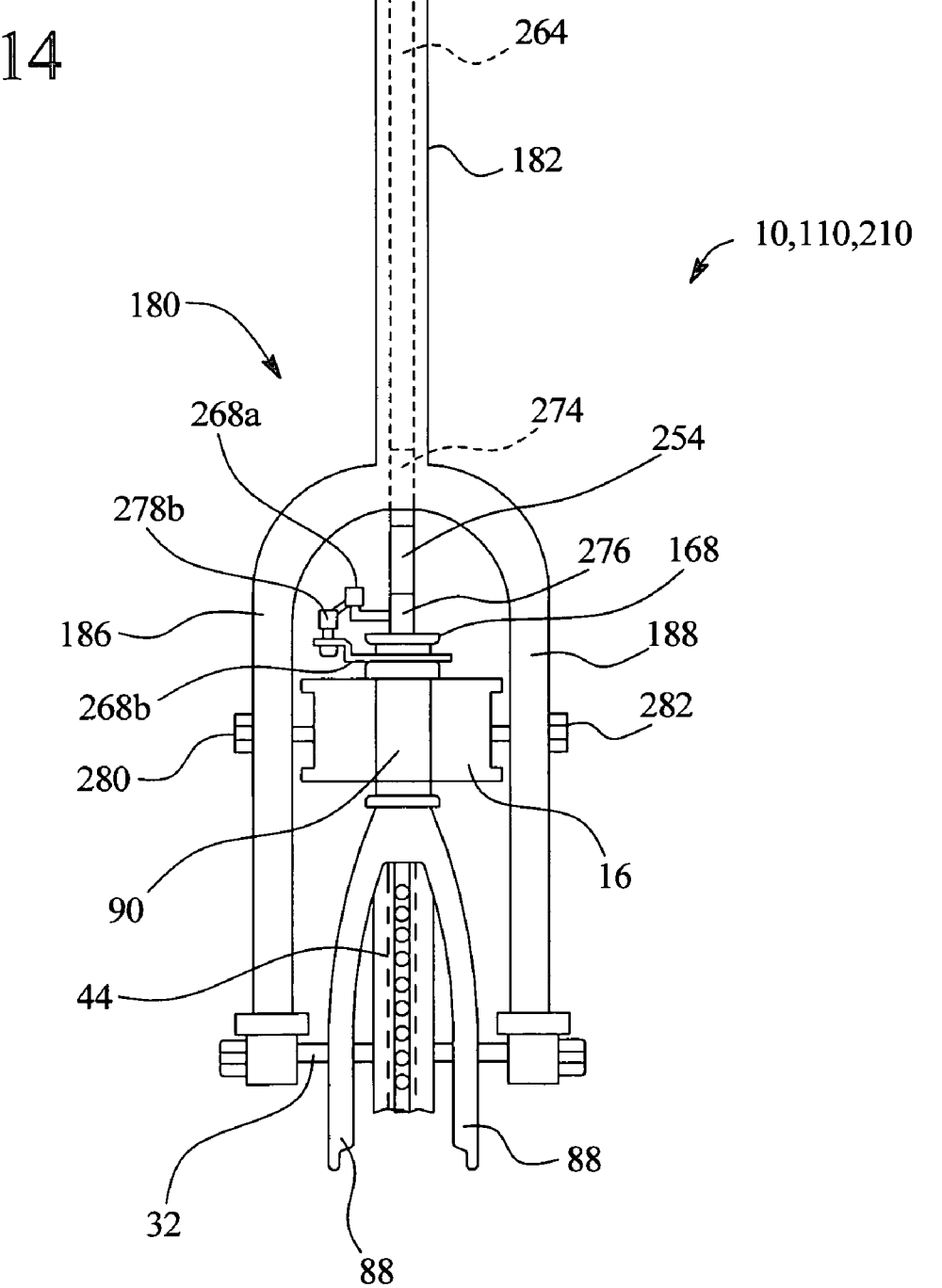
FIGS. 14 to 16 illustrate another embodiment for a hand-operated steering mechanism, which operates with the lever arm and employs a flexible drive shaft.
Figure 15:
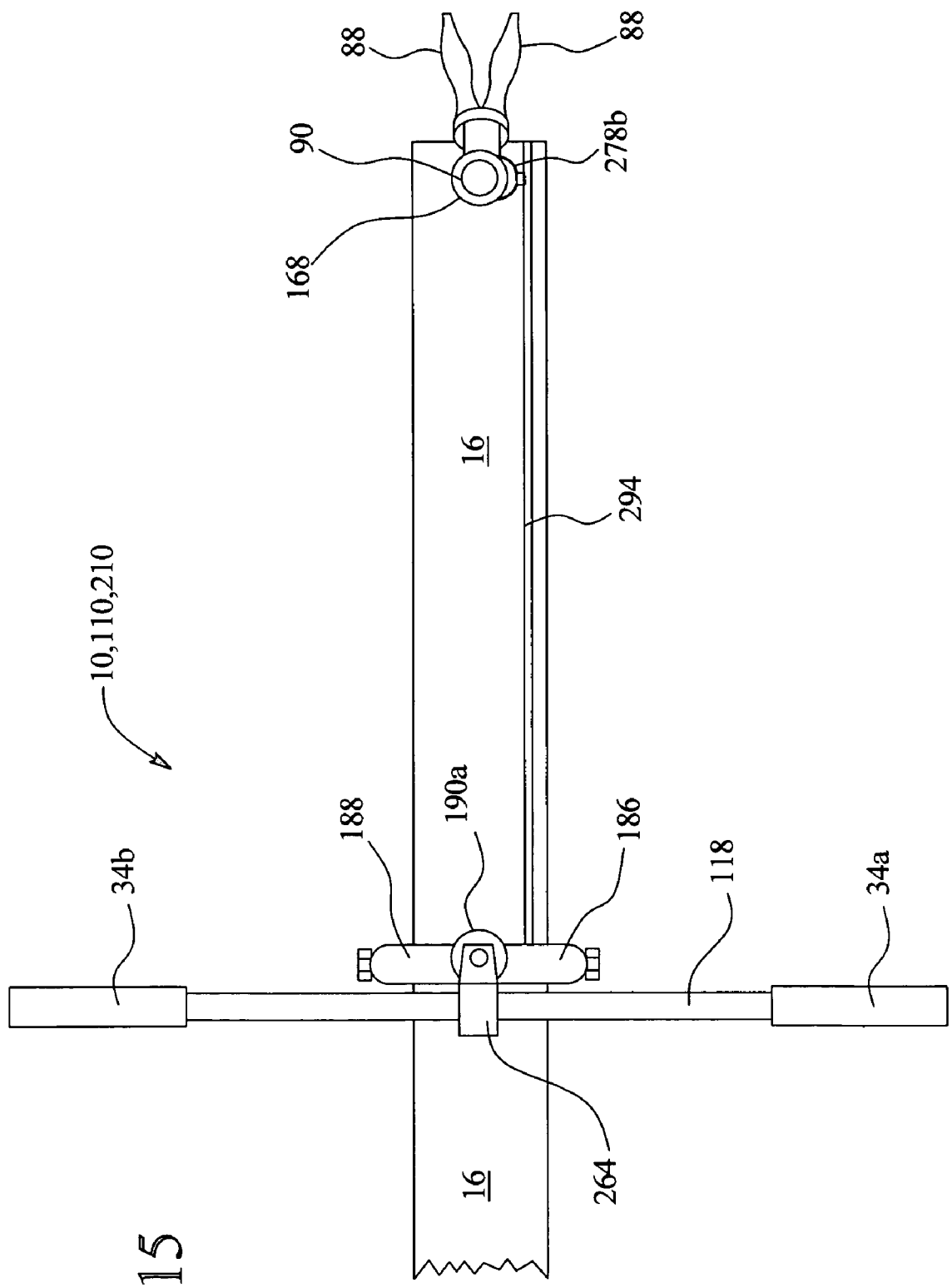
Figure 16:
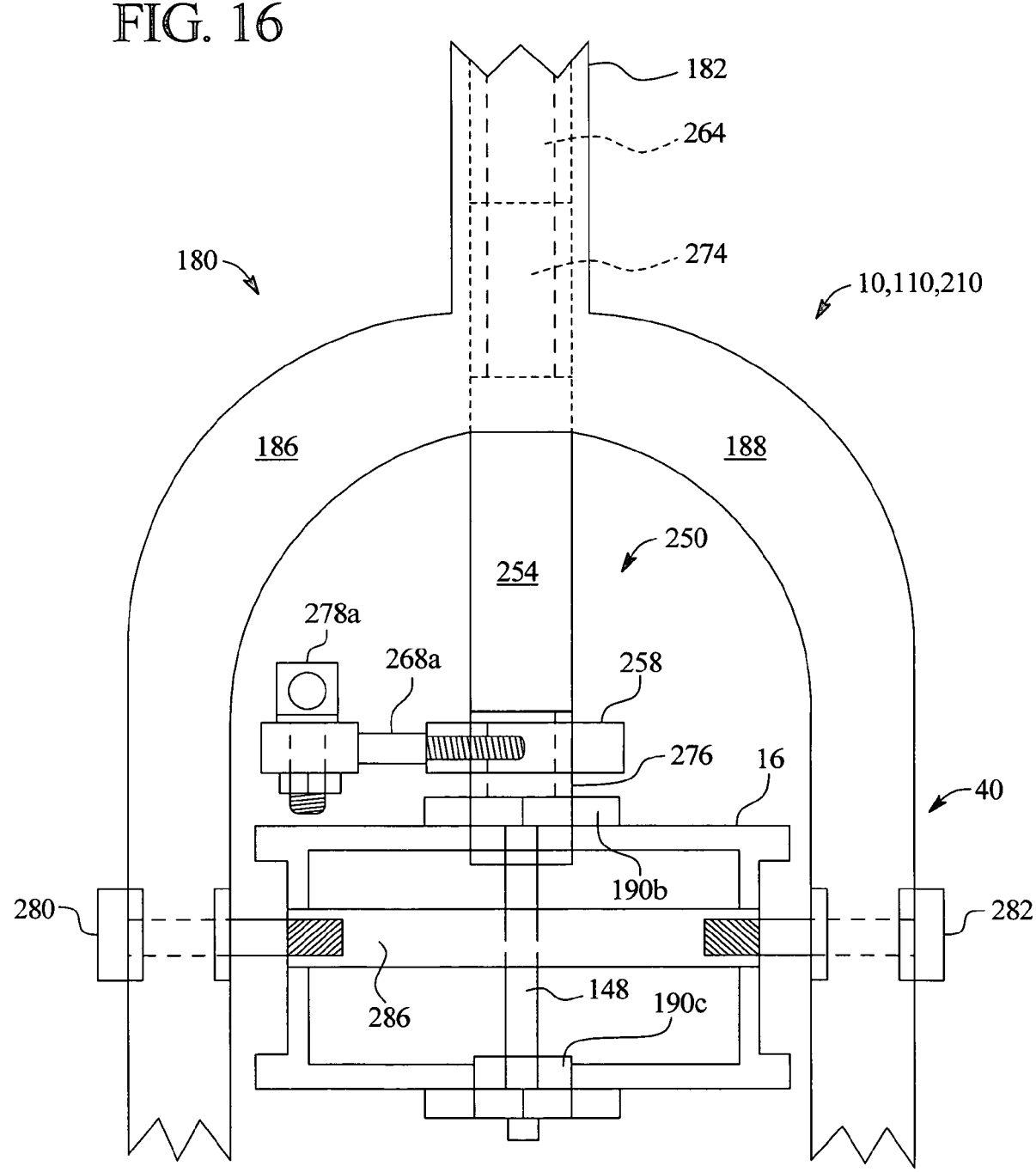

FIGS. 14 to 16 illustrate one possible embodiment for providing such member having such flexibility and torque transferring capability. Here, a flexible drive shaft 250 is employed. One suitable flexible drive shaft is supplied by McMaster Carr, Part No. 6426K111. That part includes a middle flexible section having a wound steel liner covered by cloth and reinforcing braids as well as a rubber cover.

Flexible drive shaft 250 includes a flexing portion 254 and upper and lower rigid connecting portions 274 and 276. The exposed, flexing portion 254 of flexible drive shaft 250 bends or flexes to enable lever, arm 180 to pivot back and forth. Flexible portion 254 can, however, extend up into hollow stem 182 without negatively effecting the operation of the steering system. Ends 274 and 276 are provided with a bore that receives a connector or thread of a mating member.

As seen in FIGS. 14 and 16, section 274 connects to a shaft 264. Shaft 264 extends through stem 182. A bearing 190a is mounted into stem 182 and enables shaft 264 to turn readily within stem 182. The end of shaft 264 also includes or defines a bore that receives steering arm 118. The rider turns steering arm 118 to turn shafts 264 and 250.

In one embodiment, shaft 264 and upper rigid portion 274 of flexible drive shaft 250 mate telescopically to enable shaft 264 to move translationally with respect to rigid connection portion 274. That degree of freedom enables shaft 264 to be fixed translationally to stem 182 of lever arm 180, which is desirable, albeit not critical. If Due to the fact that stem 182 and lever arm 180 connect pivotally to frame 16 at a different location than does drive shaft 250, inner shaft 264 would move slightly translationally with respect to stem 182 if shaft 264 was fixed to upper connection portion 274. While such slight translating motion would not adversely effect the operation of the vehicle, it may be less comfortable for the rider. Alternatively, shaft 264 is fixed to connection portion 274.

Lower connection portion 276 receives a collar 258. Lower portion 276 also mates with a bearing 190b, which is fitted into an upper surface of frame 16. Another bearing 190c is fitted into the lower surface of frame 16. A pin or threaded rod 148 is fastened to or extends between bearings 190b and 190c. Pin or threaded rod 148 holds or fixes flexible drive shaft 250 to frame 16. Flexible drive shaft 250, however, rotates readily with respect to frame 16 when steering arm 118 is pivoted with respect to the frame.

A threaded swing bolt 268a is threaded into female threads defined by collar 258. A steel yoke end 278a is inserted over threaded swing bolt 268a and is held in place with a machine screw in one embodiment. Parts 268a and 278a can be obtained, for example, from McMaster Carr. Steel yoke end 278a is configured to enable its upper portion to rotate with respect to the threaded swing bolt 268a so that a connecting rod 294 as seen in FIG. 15 can remain aligned with frame 16 as collar 258 and threaded swing bolt 268a are turned via the turning of steering arm 118 and drive shaft 250. The turning of collar 258 and threaded swing bolt 268a causes steel yoke end 278a, connecting rod 294 and a mating steel yoke end 278b (FIG. 15) to move forward or backward with respect to the steering column 90.

FIGS. 14, 15, 17 and 18 illustrate that a collar 168 is attached to or fixed to steering column 90. A threaded swing bolt 268b is connected to steel yoke end 278b and collar 168. With that connection, connecting rod 294 pulls or pushes steel yoke end 278b, which rotates threaded swing bolt 268b, collar 168 and steering column 90, as well as forks 88, front wheel 44 and vehicle 10, 110 and 210. FIG. 17 also illustrates that steering column is held to frame 16 via upper and lower bearings 190d and 190e, respectively.

It should be appreciated that flexible drive shaft 250 enables the person to push and pull lever arm 180 back and forth to drive the bike. Additionally, the person can turn steering arm 118, which turns shaft 264 (extending through stem 182 of lever arm 180), wherein shaft 264 imparts a turning force on drive shaft 250. Drive shaft 250 in turn turns collar 258, which turns threaded swing bolt 268a and steel yoke end 278a, which in turn pushes or pulls connecting rod 294 back and forth to turn mating steel yoke end 278b and steering column 90.

It is believed that the rigid connection of connecting rod 294 between lever arm 180 and front wheel assembly is more robust and sturdy than is the cabling assembly of FIGS. 10 to 13. Accordingly, Applicant believes that the embodiment of FIGS. 14 to 16 is preferred over the cabling system of FIGS. 10 to 12. However, the cabling system of FIGS. 10 to 12 is functionally acceptable. The present invention also includes swapping out flexible shaft 250 in FIGS. 14 to 16 with a non-telescoping double acting universal joint, which can be obtained for example from McMaster Carr, Part No. 6443K81 to 88.

Figure 19:
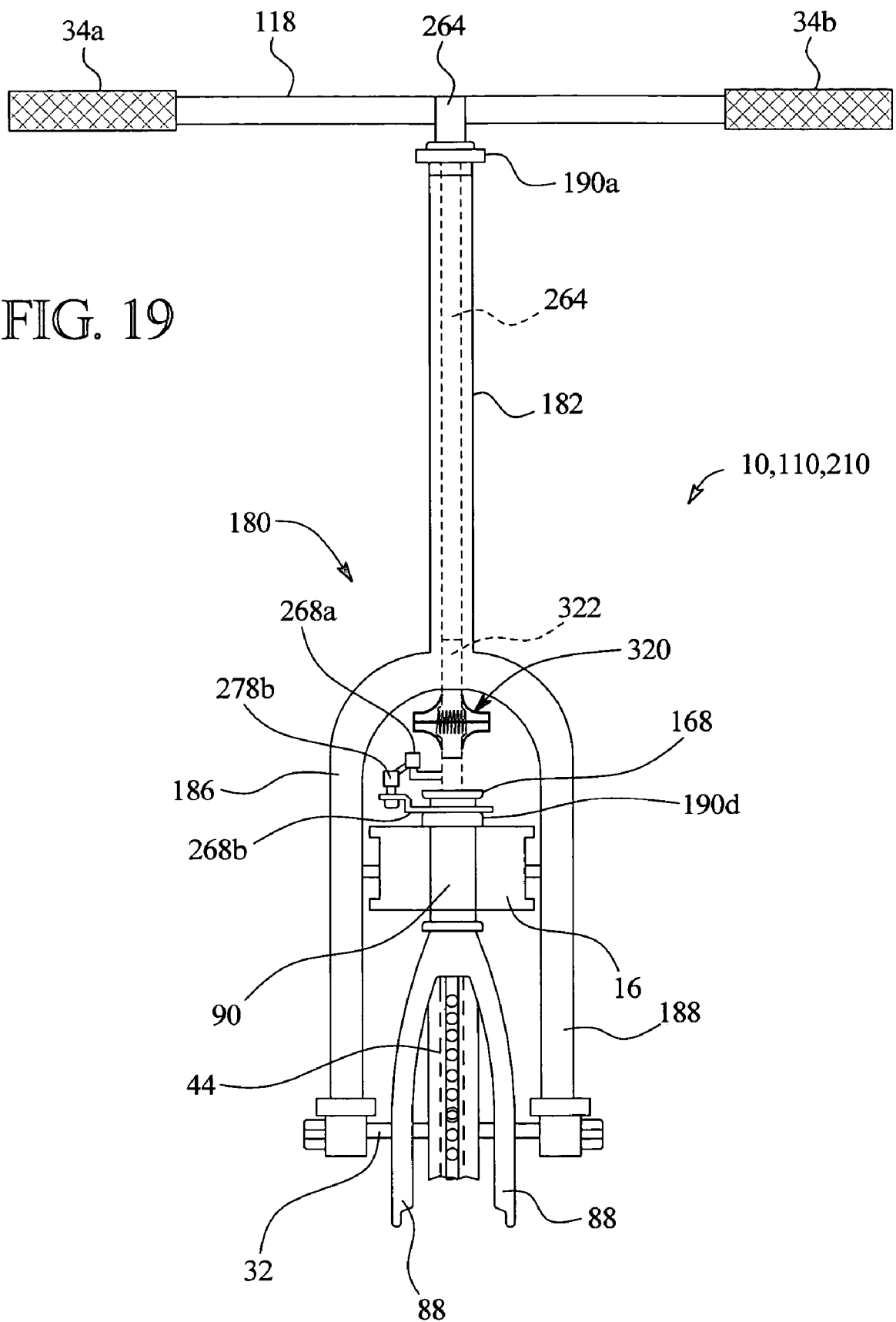
FIGS. 19 to 21 illustrate a further embodiment for a hand-operated steering mechanism, which operates with the lever arm and employs a universal gear joint.
Figure 20:
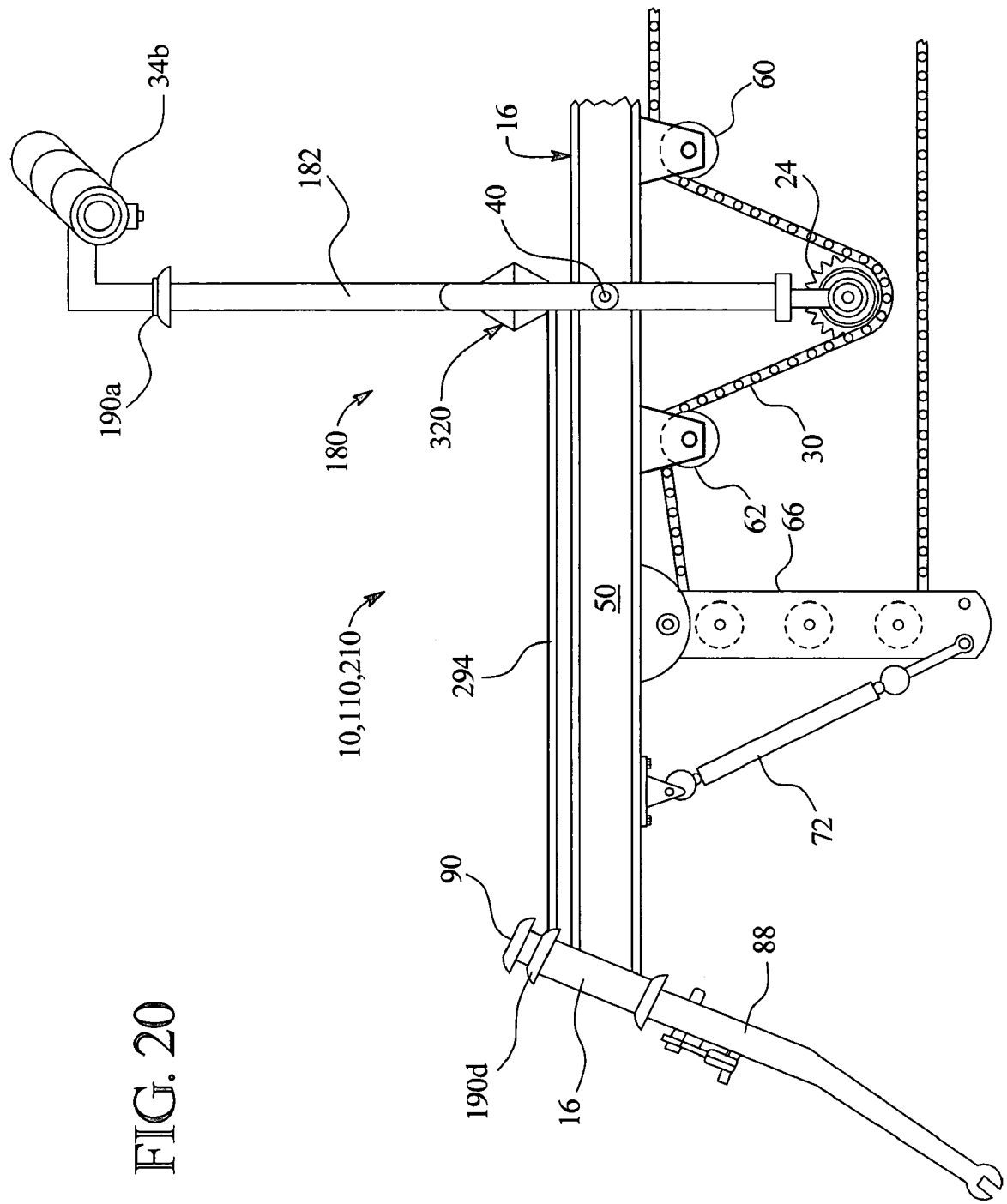
Figure 21:
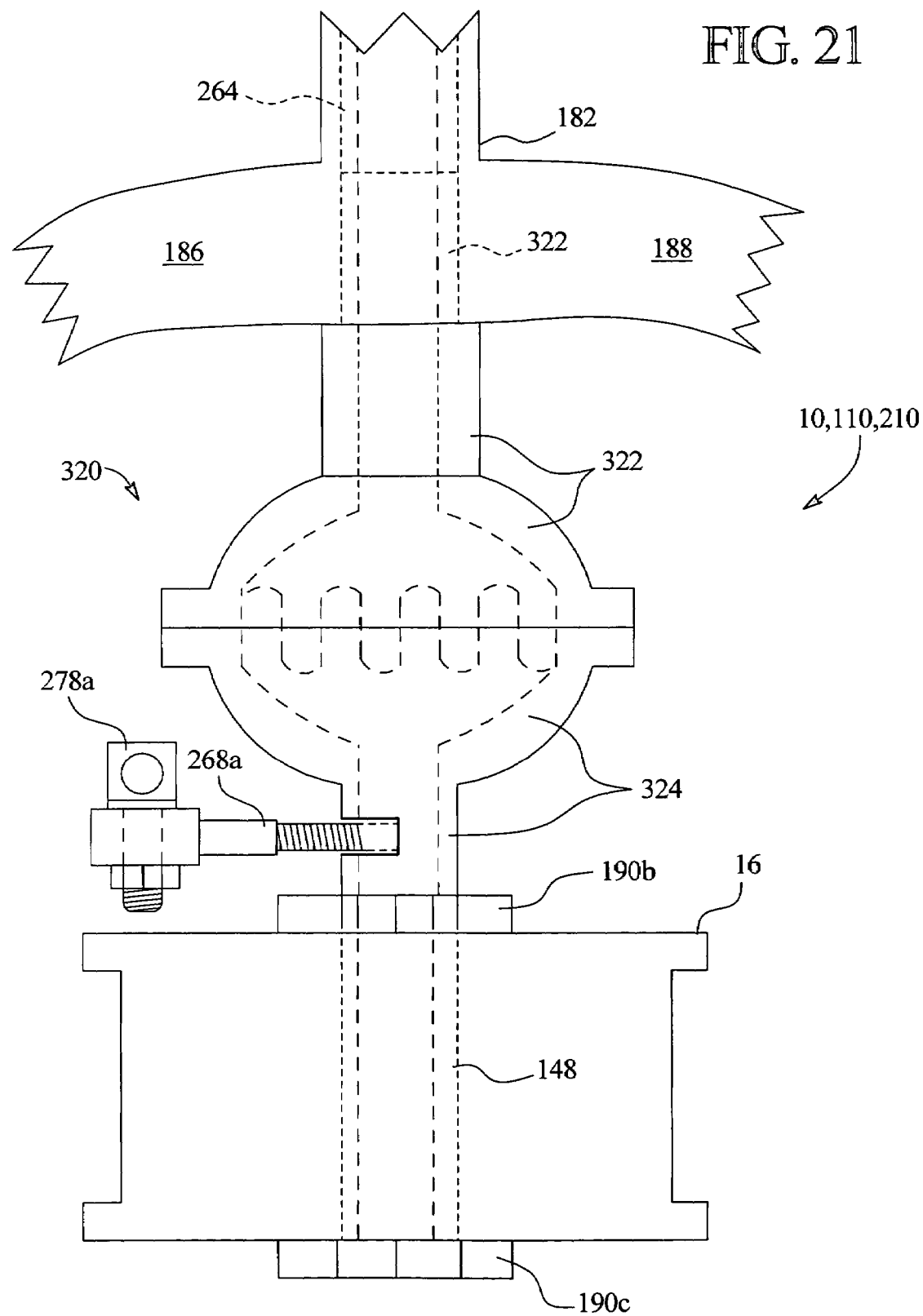

FIGS. 19 to 21 illustrate a further alternative steering assembly embodiment. The embodiment of FIGS. 19 to 21 is very similar to that of FIGS. 14 to 16. Indeed, the linkage between lever arm 180 and steering column 90 is the same and includes the latch jig bolt 268a, ball joint rod ends 278a and 278b, connecting rod 294, threaded swing bolt 268b and pulley 268a. FIG. 18 also shows that a fourth bearing 190d is inserted into frame 16 to enable steering column 90 to rotate freely with respect to frame 16.

The embodiment of FIGS. 19 to 21, like that of FIGS. 14 to 16, includes an inner shaft 264 that extends through stem 182 of lever arm 180. A bearing 190a is inserted into stem 182 to enable shaft 264 to rotate freely within stem 182. The rider again uses handles 34a and 34b to turn steering arm 118 and shaft 264, which in turn steers wheel 44 and vehicle 10, 110 and 210.

One primary difference in FIGS. 19 to 21 is that the flexible drive shaft 250 of FIGS. 14 to 16 is replaced by a universal gear joint 320. Universal gear joint 320 can be attained, for example, from McMaster-Carr, part numbers 6450K1 to K3. That gear joint enables upper and lower portions 322 and 324, respectively, to transfer torque to latch jig bolt 268a at an angle of, e.g., between 3 and 136 degrees. Upper and lower ends 322 and 324 each include mounting shafts that extend into and mount inside of a mating member.

Another primary difference between the embodiment of FIGS. 19 to 21 and the other embodiments described herein is that the universal gear joint 320 provides the hinge point connecting lever arm 180 to frame 16. In each of the other embodiments, the lever arm is connected to frame 16 via pivot 40. The elimination of pivot 40 in the instant embodiment eliminates the need to compensate for any relative translational motion between the stem 182 and shaft 264 due to the differently located pivot points described above in connection with the embodiment of FIGS. 14 to 16. It should therefore be appreciated that upper portion 322 can be fixed translationally to shaft 264, located inside stem 182. Stem 182 and shaft 264 both rotate about the axis of gear joint 320. Shaft 264 does not therefore translate with respect to stem 182, which is desirable.

The universal gear joint 320, like the flexible drive shaft 250, enables the lever arm 180 to be pivoted back and forth to drive vehicle 10, 110 or 210, while also enabling a turning torque to be applied to the threaded swing bolt 268a and steel yoke ends 278a and 278b as well as connecting rod 294 to turn wheel 44 and vehicle 10, 110 or 210. As illustrated, lower portion 322 is threaded to receive threaded swing bolt 268a. Bearings 190b and 190c are inserted into frame 16, which receive bolt or fastener 148 that fixes lower portion 324 and universal gear joint 320 to frame 16.

The apparatus shown above in FIGS. 17 and 18 is also used in connection with universal gear joint 320 of FIGS. 19 to 21. Furthermore, the apparatus is used in connection with the telescoping double universal joint 350 described below in one embodiment.

Figure 22:
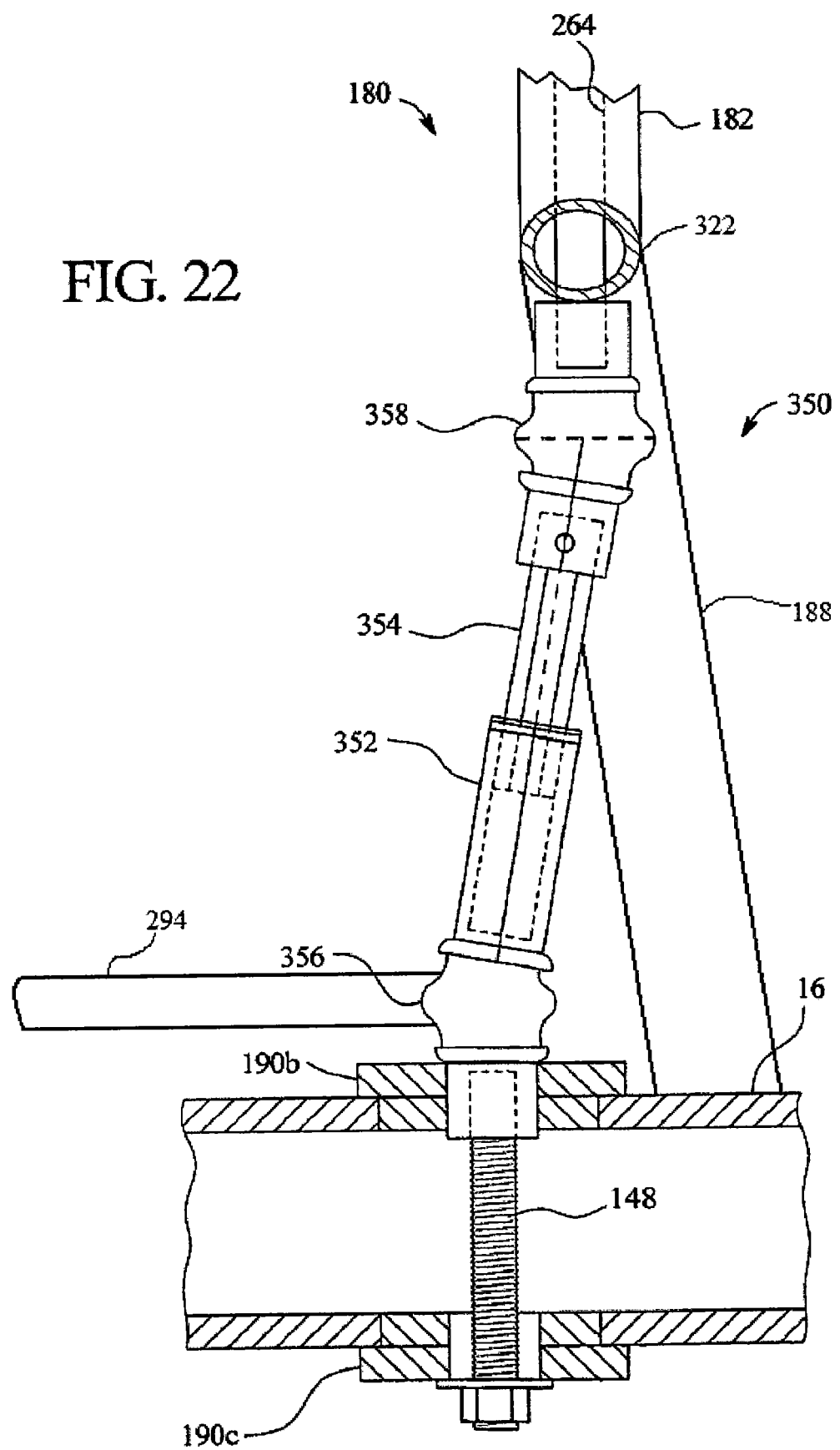
FIG. 22 illustrates a double universal joint with telescoping ability for operation with the steering mechanism and lever arm of the present invention.

Referring now to FIG. 22, one preferred embodiment for the steering assembly of the present invention employs a telescoping double universal joint 350. Telescoping double universal joint 350 provides the pivoting flexibility to drive lever arm 180 as well as the torque transferring ability to turn front wheel 44 and vehicle 10, 110 or 210 as described above. Telescoping double universal joint 350 also provides translational flexibility via telescoping members 352 and 354 for comfort while turning during rowing and to account for any translational change of position of lever arm 180 throughout the pivoting drive stroke. The telescoping U-joint 350 also enables the respective parts to be quickly replaced if need be.

Fastener 148 is coupled to lower universal joint 356, while inner shaft 264 is coupled to upper universal joint 358. Telescoping double universal joint 350 couples to lever arm 180 and inner shaft 264 as described above. A simple rigid shaft 264 is coupled directly to upper U-joint 358, simplifying the assembly within hollow stem 182. Further, joint 350 couples rotatably to frame 16 via bearings 190b and 190c and fastener 148 as described above. Universal joints 356 and 358 provide the bending flexibility as well as the torque transferring capability for joint 350.

Lower universal joint 356 is coupled to an outer member 352. Outer member 352 telescopically receives inner member 354, which is coupled to upper U-joint 358. Telescoping members 352 and 354 are also keyed or otherwise mated in a male and female relationship so that torque is transferred from inner member 354, to outer member 352, to lower universal joint 356 and threaded swing bolt 268b. Threaded swing bolt 268b rotates with universal joint 356 and defines a thread that receives threaded swing bolt 268a as described above. The remainder of the assembly from threaded swing bolt 268a to front wheel 44 is the same as described in the two previous embodiments.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A manually powered vehicle comprising:
   a frame;
   a first free-wheel driver that rotates with respect to the frame and drives a driven wheel;
   a lever arm that pivots with respect to the frame, the lever arm including a first end that is gasped and moved by a person and a second end that is in rotatable communication with a second free-wheel driver;
   a linkage that is moved by the second free-wheel driver when the person pivots the first end of the lever arm, wherein the linkage causes the first free-wheel driver to rotate;
   a pair or rollers affixed to the frame and arranged such that the second free-wheel driver is movable therebetween, the pair of rollers configured and arranged to increase a contact area between the linkage and the second free-wheel driver; and
   a steerable wheel in rotatable communication with the frame.

2. The manually powered vehicle of claim 1, which includes a pair of steerable wheels in rotatable communication with the frame.

3. The manually powered vehicle of claim 1, which includes at least one braking mechanism operable with at least one of the driven or steerable wheels.

4. The manually powered vehicle of claim 1, wherein the first free-wheel driver rotates with a plurality of different gears, and which includes a gear changing apparatus operable to change the linkage from one gear to another.

5. The manually powered vehicle of claim 1, wherein the lever arm is coupled to the frame at a pivot point and the rollers of the pair are coupled to the frame on opposite sides of the pivot point.

6. The manually powered vehicle of claim 1, the manually powered vehicle selected from the group consisting of: a rowbike and a wheelchair.

7. The manually powered vehicle of claim 1, which includes a steering mechanism that controls the steerable wheel.

8. The manually powered vehicle of claim 7, wherein the steering mechanism is: (i) foot operated, (ii) cable operated, (iii) operated using the lever arm, (iv) operated via a rod moved by the lever arm, (v) operated via a universal joint moved by the lever arm, (vi) operated via a flexible drive shaft moved by the lever arm, or (vii) operated via any suitable combination thereof.

9. A manually powered vehicle comprising:
a frame;
a first rotator that rotates with respect-to the frame, the first rotator driving a driven wheel;
a lever arm that pivots with respect to the frame, the lever arm including a first end that is gasped and moved by a person and a second end that is in rotatable communication with a second rotator;
a linkage that is moved by the second rotator when the person pivots the first end of the lever arm from a first position to a second position, the linkage aided in being wrapped about the second rotator by at least one additional rotator secured to the frame such that the second rotator translates relative to the additional rotator as the lever arm pivots, and wherein the linkage rotates the first rotator and the driven wheel; and
a seat that slides along the frame as the lever arm is pivoted back and forth.

10. The manually powered vehicle of claim 9, wherein the second rotator rotates freely in one direction relative to the lever arm and enables the first end of the lever arm to move back from the second position to the first position without driving the linkage.

11. The manually powered vehicle of claim 9, wherein the first rotator rotates freely in one direction relative to the driven wheel.

12. The manually powered vehicle of claim 9, wherein the linkage is a chain and the first and second rotators are sprockets.

13. The manually powered vehicle of claim 9, wherein the third rotator is a roller.

14. The manually powered vehicle of claim 9, which includes a steerable wheel and a steering mechanism that controls the steerable wheel.

15. The manually powered vehicle of claim 14, wherein the steering mechanism is: (i) foot operated, (ii) cable operated, (iii) operated using the lever arm, (iv) operated via a rod moved by the lever arm, (v) operated via a universal joint moved by the lever arm, (vi) operated via a flexible drive shaft moved by the lever arm, or (vii) operated via any suitable combination thereof.

16. The manually powered vehicle of claim 14, which includes at least one braking mechanism operable with at least one of the driven or steerable wheels.

17. A manually powered vehicle comprising:
a frame;
a first rotator that rotates with respect to the frame, the first rotator driving a driven wheel;
a lever arm that pivots with respect to the frame, the lever arm including a first end that is gasped and moved by a person and a second end that is in rotatable communication with a second rotator;
a linkage that is moved by the second rotator when the person pivots the first end of the lever ann, wherein the linkage rotates the first rotator and the driven wheel; and
a steerable wheel and a steering member operated by the lever arm to steer the steerable wheel, the steering member in moveable communication with a bending apparatus, the bending apparatus enabling the lever arm to be pivoted and steered,
wherein the steering member includes a rod in moveable communication with (i) the bending apparatus and (ii) a fork supporting the steerable wheel.

18. The manually powered vehicle of claim 17, wherein the bending apparatus is selected from the group consisting of: a universal joint, a universal gear joint, a telescoping member, a flexible drive shaft and any combination thereof.

19. The manually powered vehicle of claim 18, wherein the universal joint is a double acting universal joint.

20. The manually powered vehicle of claim 18, wherein the universal joint is a telescoping universal joint.

21. The manually powered vehicle of claim 18, wherein the flexible drive shaft includes a wound coil inner portion attached to end connector portions.

22. The manually powered vehicle of claim 17, wherein the lever arm includes a non-steerable outer tube through which a steerable portion extends to a handle portion of the lever arm.

23. The manually powered vehicle of claim 22, wherein the steerable portion of the lever arm includes an extension that extends out of the tube, and wherein the extension is connected to the steering member.

* * * * *